United States Patent
Koonce et al.

(10) Patent No.: US 11,629,822 B1
(45) Date of Patent: Apr. 18, 2023

(54) SYSTEMS AND METHODS FOR DISPENSING OF GAS FROM GAS CYLINDERS

(71) Applicant: BayoTech Inc., Albuquerque, NM (US)

(72) Inventors: Michael Koonce, Albuquerque, NM (US); Peter Anderson, Albuquerque, NM (US); Daniel Lauer, Tulsa, OK (US); David Buttress, Owasso, OK (US); Donald Bishop, Nowata, OK (US)

(73) Assignee: BAYOTECH, INC., Albuquerque, NM (US)

( * ) Notice: Subject to any disclaimer, the term of this patent is extended or adjusted under 35 U.S.C. 154(b) by 0 days.

(21) Appl. No.: 17/528,012

(22) Filed: Nov. 16, 2021

(51) Int. Cl.
*F16K 13/08* (2006.01)
*F17C 13/08* (2006.01)

(52) U.S. Cl.
CPC .......... *F17C 13/081* (2013.01); *F17C 13/083* (2013.01); *F17C 2205/0107* (2013.01); *F17C 2205/0142* (2013.01); *F17C 2205/0146* (2013.01); *F17C 2205/0157* (2013.01); *F17C 2205/0311* (2013.01); *F17C 2205/0323* (2013.01); *F17C 2270/0168* (2013.01)

(58) Field of Classification Search
CPC .................. F17C 13/081; F17C 13/083; F17C 2205/0146; F17C 2205/0323; F17C 2270/0168
See application file for complete search history.

(56) References Cited

U.S. PATENT DOCUMENTS

| | | | |
|---|---|---|---|
| 2,087,300 | A | 7/1937 | Ragonnet |
| 3,185,336 | A | 5/1965 | Goss |
| 6,676,163 | B2 | 1/2004 | Joitescu et al. |
| 7,178,565 | B2 | 2/2007 | Eichelberger et al. |

FOREIGN PATENT DOCUMENTS

| | | |
|---|---|---|
| EP | 1800930 | 6/2007 |
| EP | 2851605 | 3/2015 |
| GB | 1507086 | 4/1978 |
| JP | 2015/230071 | 12/2015 |

OTHER PUBLICATIONS

PCT International Search Report and Written Opinion in International Appln. No. PCT/US2021/059556, dated Mar. 2, 2022, 10 pages.
luxfercylinders.com, [online] "Luxfer GTM Technologies: Bulk gas transport solutions," upon information and belief, available no later than Nov. 16, 2021, retrieved Jun. 2, 2022, retrieved from URL <https://www.luxfercylinders.com/img/luxfer/products_upload/2019%20Luxfer%20GTM%20spec%20sheet.pdf>, 2 pages.

*Primary Examiner* — Paul J Gray
(74) *Attorney, Agent, or Firm* — Fish & Richardson P.C.

(57) ABSTRACT

A gas dispensing system includes a frame configured to house multiple rows of gas cylinders, a common gas manifold fluidically coupled to a gas outlet for dispensing of gas from the gas cylinders, a gas manifold for each row of gas cylinders configured to be fluidically coupled to each cylinder in the row by a respective dispensing valve, a vent manifold for each row of gas cylinders, in which the vent manifold for a given row of gas cylinders is configured to be fluidically coupled to each cylinder in the row via a respective vent valve, in which each vent valve is configured to open when a temperature on the vent valve exceeds a threshold temperature, and a common vent manifold, in which each vent manifold is fluidically coupled to the common vent manifold.

22 Claims, 21 Drawing Sheets

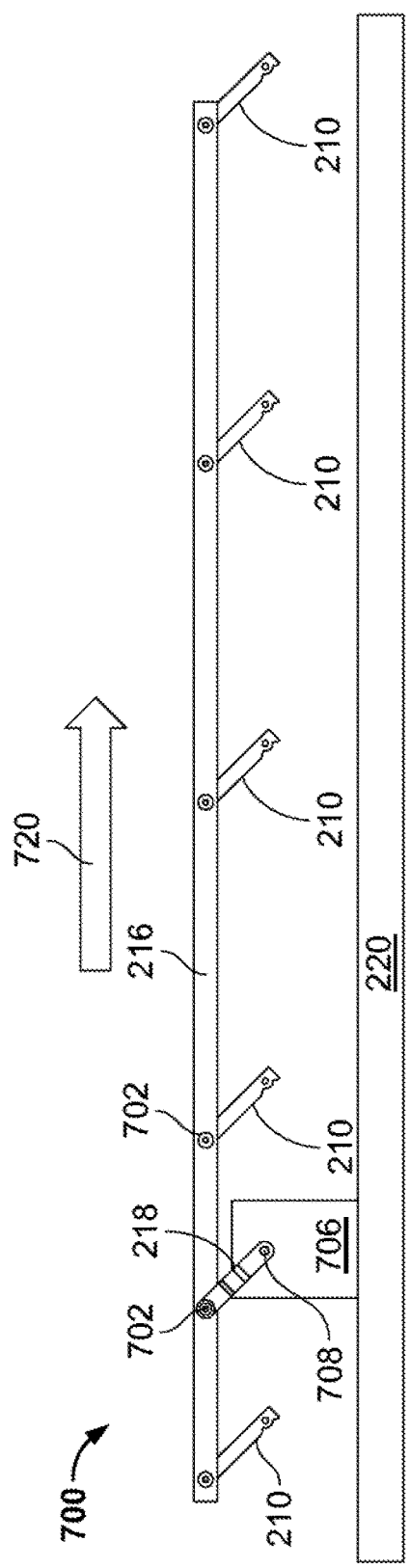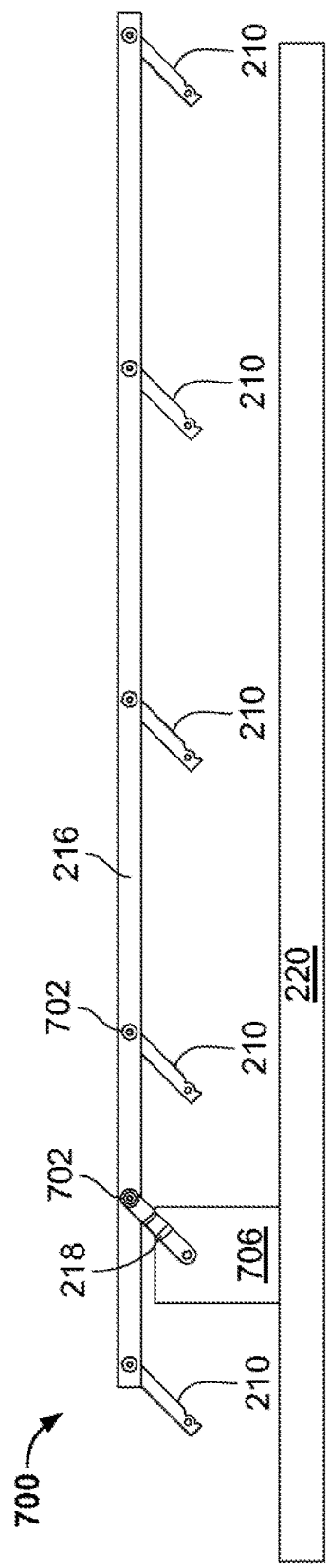

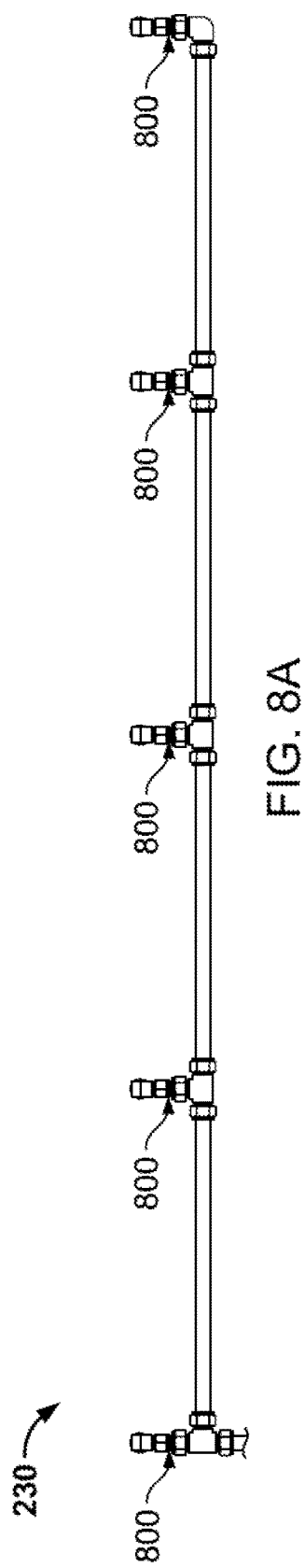
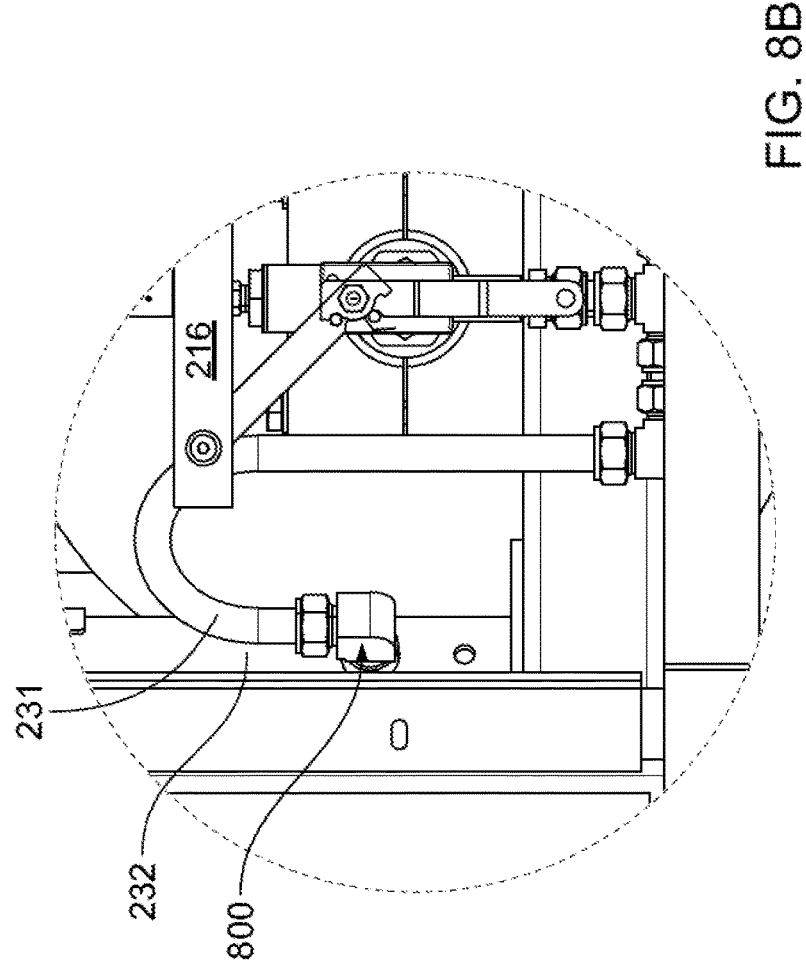
FIG. 8A
FIG. 8B

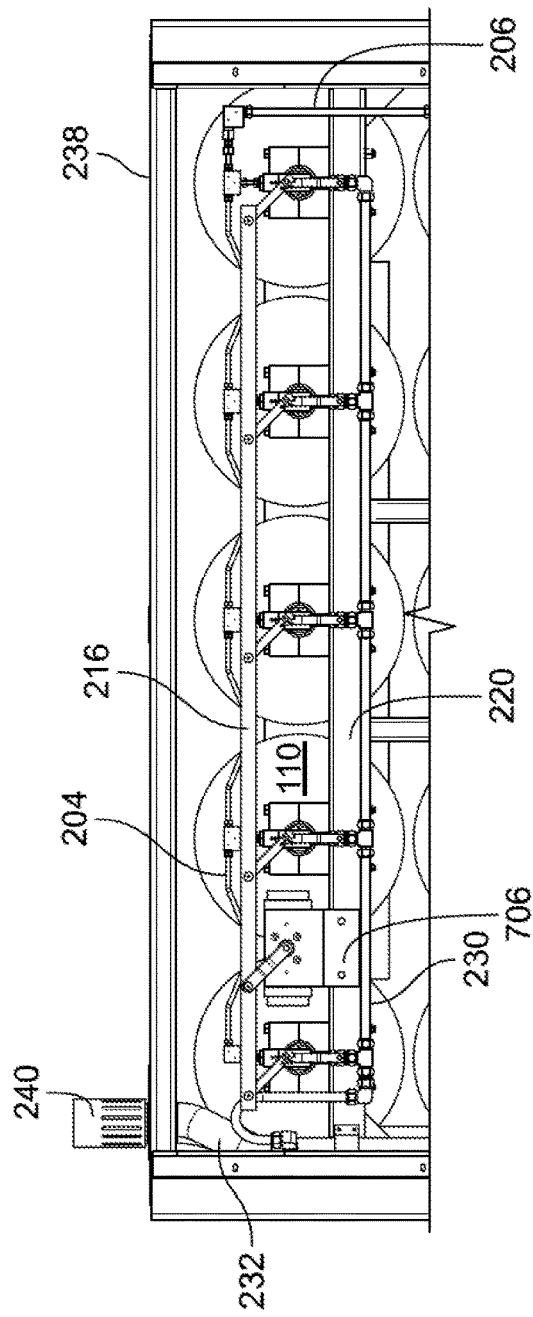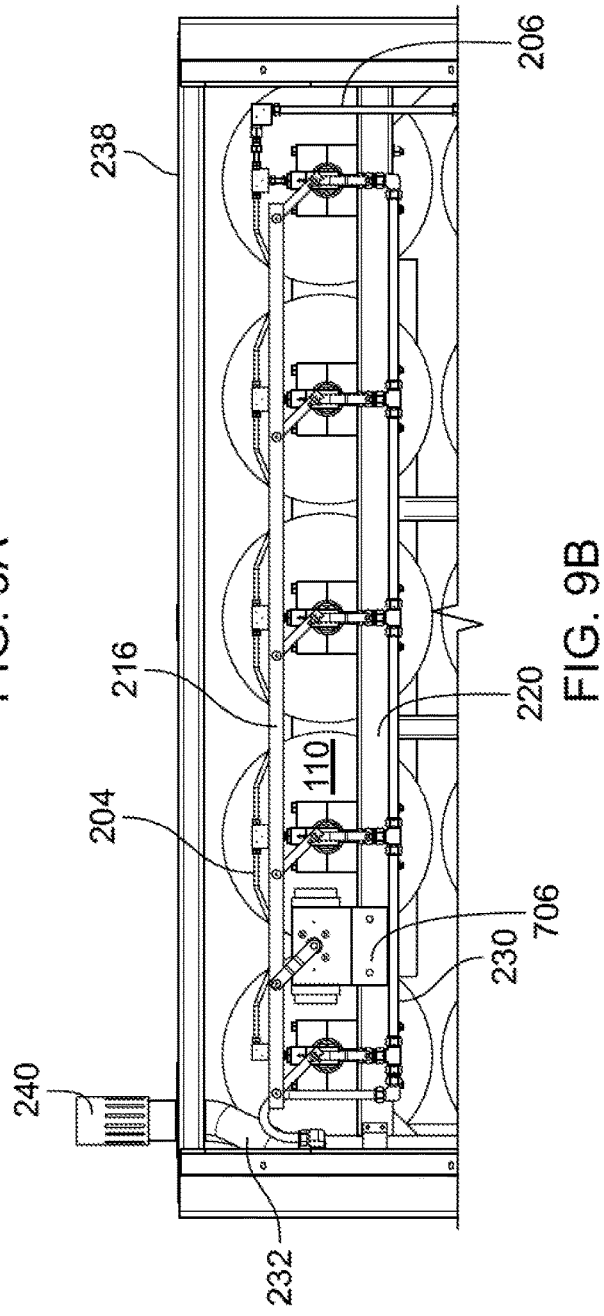

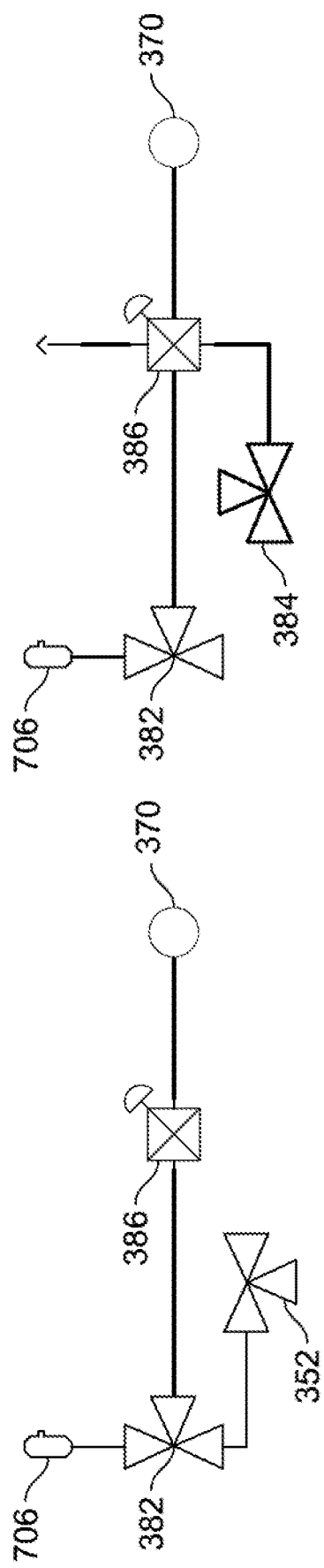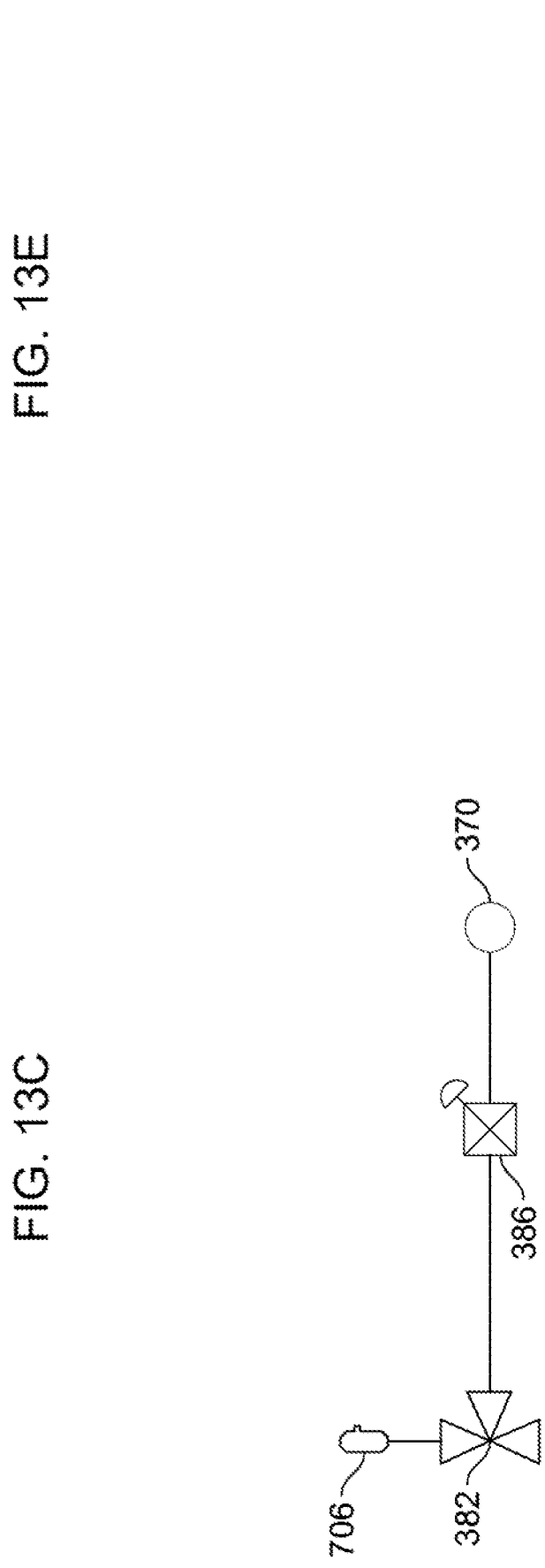
FIG. 13E
FIG. 13C
FIG. 13D

460 — Air is provided to pneumatic circuitry of a gas dispensing system from an air tank of an air brake system of a trailer 462 — A switch in a control panel mounted on the trailer is operated 464 — A control lever for a row of gas cylinders corresponding to the switch is actuated 466 — Actuation bar for the row of gas cylinders is moved 468 — A lever for each gas cylinder in the row is actuated 470 — A dispensing valve for each gas cylinder is opened 472 — Gas is dispensed

FIG. 14

SYSTEMS AND METHODS FOR DISPENSING OF GAS FROM GAS CYLINDERS

BACKGROUND

Gases, such as hydrogen gas, can be used as an energy source for various applications, e.g., as fuel for vehicles, in houses, or in portable power sources.

SUMMARY

We describe here a gas handling system for storage and transportation of gas cylinders and for dispensing of gas, such as hydrogen or nitrogen, from the cylinders.

In one general aspect, a gas dispensing system includes a frame configured to house multiple rows of gas cylinders. The system includes fluidically coupled to a gas outlet for dispensing of gas from the gas cylinders. The system includes a gas manifold for each row of gas cylinders, in which the gas manifold for a given row of gas cylinders is configured to be fluidically coupled to each cylinder in the row by a respective dispensing valve, and in which each gas manifold is fluidically coupled to the common gas manifold. The system includes a vent manifold for each row of gas cylinders, in which the vent manifold for a given row of gas cylinders is configured to be fluidically coupled to each cylinder in the row via a respective vent valve, in which each vent valve is configured to open when a temperature on the vent valve exceeds a threshold temperature. The system includes a common vent manifold, in which each vent manifold is fluidically coupled to the common vent manifold, and in which an end portion of the common vent manifold extends through an opening defined in a cover of the frame.

Implementations can include one or any combination of the following features.

The gas dispensing system includes a lever for each gas cylinder, in which each lever is configured to be coupled to the dispensing valve of the corresponding gas cylinder, and an actuation bar for each row of gas cylinders, in which the levers for the gas cylinders in each row are attached to the actuation bar for the corresponding row.

The gas dispensing system includes a control lever for each actuation bar, in which each control lever is mounted on the frame and attached to the corresponding actuation bar, and in which actuation of the control lever for a given row causes motion of the actuation bar for the row to open or close the dispensing valves for the gas cylinders in the row.

The gas dispensing system includes a pneumatic circuit for each row of gas cylinders, in which motion of the control lever for a given row is actuated by the corresponding pneumatic circuit. The gas dispensing system includes a control panel comprising a switch for controlling each pneumatic circuit.

The pneumatic circuits of the gas dispensing system are configured to be coupled to an air supply. The air supply of the gas dispensing system includes a tank for an air brake system of a vehicle on which the frame is mountable. Each pneumatic circuit of the gas dispensing system is coupled to a respective port of a multi-tube connector.

The gas dispensing system includes an emergency switch, in which actuation of the emergency switch is configured to cause venting of air in each pneumatic circuit.

Each pneumatic circuit of the gas dispensing systems includes first pneumatic circuitry controllable by a respective switch and second pneumatic circuitry coupled to a respective port of a multi-tube connector, and in which actuation of the emergency switch is configured to cause venting of air in the first pneumatic circuitry and the second pneumatic circuitry of each pneumatic circuit.

The gas dispensing system includes an arched connection coupling each vent manifold to the common vent manifold.

The gas dispensing system includes a rear vent manifold for each row of gas cylinders, in which the vent manifold for a given row of gas cylinders is configured to be fluidically coupled to a rear venting device of each cylinder in the row, in which each rear venting device is configured to open when a temperature on the rear venting device exceeds a threshold temperature, and a common rear vent manifold, in which each rear vent manifold is fluidically coupled to the common rear vent manifold.

The gas dispensing system includes a rear vent cap slidably coupled to the common rear vent manifold such that the rear vent cap can slide along an end portion of the common rear vent manifold, the end portion of the common rear vent manifold extending through a rear opening defined in the cover of the frame.

The gas dispensing system including a vent cap slidably coupled to the common vent manifold such that the vent cap can slide along the end portion of common vent manifold. The vent cap has a cylindrical shape, and in which a slit is defined along an axis of the cylinder. The end of the common vent manifold includes a protrusion disposed in the slit of the vent cap.

The gas dispensing system in which the frame includes diagonal struts on a side face of the frame, each diagonal strut extending from a top corner to an opposite bottom corner of the side face of the frame.

The gas dispensing system in which the frame is mountable on a trailer.

In a general aspect, a method of dispensing gas includes providing air to pneumatic circuits of a gas dispensing system from an air supply.

The gas dispensing system including a frame housing multiple rows of gas cylinders. The gas dispensing system including a common gas manifold fluidically coupled to a gas outlet for dispensing of gas from the gas cylinders. The gas dispensing system including a gas manifold for each row of gas cylinders, in which the gas manifold for a given row of gas cylinders is fluidically coupled to each cylinder in the row via a respective dispensing valve, and in which each gas manifold is fluidically coupled to the common gas manifold. The gas dispensing system including a control lever for each row of gas cylinders, each control lever coupled to a respective one of the pneumatic circuits, in which actuation of the control lever for a given row causes the dispensing valve of each cylinder in the row to open or close. The gas dispensing system including a vent manifold for each row of gas cylinders, in which the vent manifold for a given row of gas cylinders is fluidically coupled to each cylinder in the row via a respective vent valve, and a common vent manifold, in which each vent manifold is fluidically coupled to the common vent manifold.

The method includes actuating a particular one of the pneumatic circuits, in which actuating the particular pneumatic circuit actuates a particular control lever coupled thereto to cause the dispensing valves of the gas cylinders in the corresponding row to open, resulting in gas flow from the gas cylinders in the row, through the gas manifold for the row, through the common gas manifold, and out the gas outlet.

The method includes operating an emergency switch to vent gas along each vent manifold and through the common vent manifold.

Implementations can include one or any combination of the following features.

Actuation of the control lever for a given row causes motion of an actuation bar for the row. A lever is coupled to the dispensing valve of each gas cylinder and to the actuation bar such that motion of the actuation bar for a given row causes the dispensing valves for the gas cylinders in the row to open or close.

Providing air to the pneumatic circuits of the gas dispensing system includes providing air to the pneumatic circuits from an air tank of an air brake system of a vehicle on which the gas dispensing system is mounted.

Actuating the particular pneumatic circuit includes operating a corresponding switch coupled to the particular control lever by the pneumatic circuitry.

Actuating the particular pneumatic circuit includes actuating the particular pneumatic circuit using a programmable logic controller coupled to the particular pneumatic circuit.

Each pneumatic circuit includes first pneumatic circuitry controllable by a respective switch and second pneumatic circuitry coupled to a respective port of a multi-tube connector, and in which operating the emergency switch causes venting of air in the first pneumatic circuitry and the second pneumatic circuitry of each pneumatic circuit.

The approaches described here can have one or more of the following advantages. A frame is provided that houses multiple rows of gas cylinders in a modular format such that one or more frames may be mounted on a bed of a trailer and transported to a dispensing or filling location. A control panel, also which may be mounted on the bed of the trailer, can be used by an operator to open or close the gas cylinders, e.g., to dispense gas from the cylinders or to fill the cylinders with gas. The cylinders in each row of cylinders are controllable as a unit, and each row of cylinders is controllable independently from each other row. In some cases, the opening and closing of the cylinders in each row is pneumatically actuated, with pneumatic circuitry that uses air from, for example, an air brake system of the trailer on which the frame is mounted. The cylinders in each row of cylinders are coupled to an exhaust manifold that enables gas from the cylinders to be vented into the environment in a safe and efficient manner, e.g., in the event that a temperature in the gas cylinders exceeds a threshold level.

The details of one or more implementations are set forth in the accompanying drawings and the description below. Other features and advantages will be apparent from the description and drawings, and from the claims.

BRIEF DESCRIPTION OF DRAWINGS

FIGS. 7A and 7B are diagrams of a pneumatic actuation arm assembly.

FIG. 8A is a diagram of a vent manifold.

FIG. 8B is a diagram of an arched connection.

FIGS. 9A-9C are diagrams of a venting subassembly including a vent cap with the vent cap shown in the closed position in FIGS. 9A and 9C and in the open position in FIG. 9B.

FIGS. 13B-13E are diagrams of pneumatic circuitry.

FIG. 14 is a flow chart.

DETAILED DESCRIPTION

We describe a gas handling system for storage and transportation of gas cylinders and for dispensing of gas, such as hydrogen or nitrogen, from the cylinders. A frame houses multiple rows of gas cylinders. One or more frames may be mounted on a bed of a trailer. A control panel, also which may be mounted on the bed of the trailer, can be used by an operator to open or close the gas cylinders, e.g., to dispense gas from the cylinders or to fill the cylinders with gas. The cylinders in each row of cylinders are controllable as a unit, and each row of cylinders is controllable independently from each other row. In some cases, the opening and closing of the cylinders in each row is pneumatically actuated, with pneumatic circuitry that uses air from, for example, an air brake system of the trailer on which the frame is mounted. The cylinders in each row of cylinders are coupled to an exhaust manifold that enables gas from the cylinders to be vented into the environment, e.g., in the event that a temperature in the gas cylinders exceeds a threshold level, for example, 102 degrees Celsius.

Figure 1:
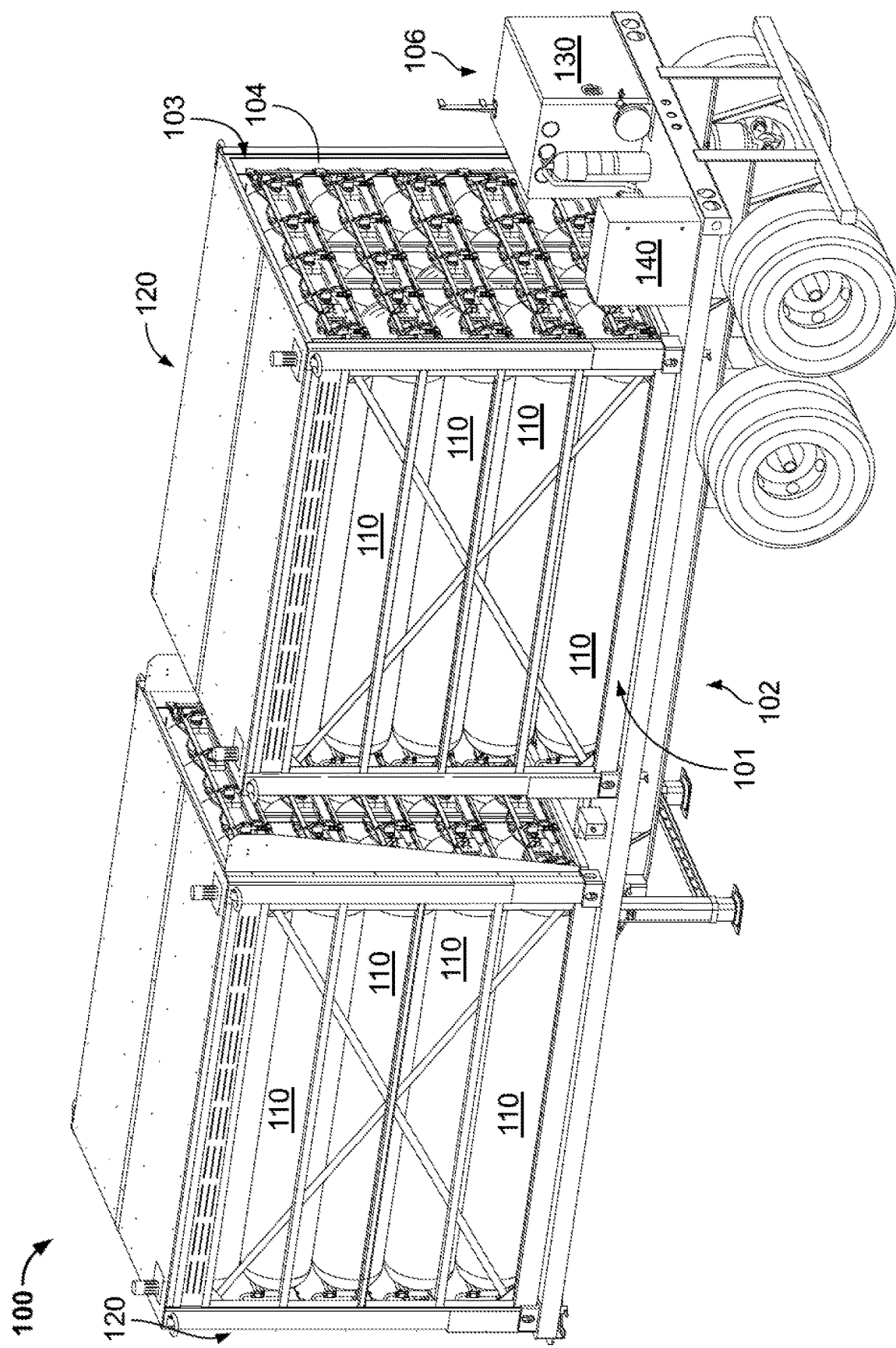
FIG. 1 is a diagram of a gas handling system.

FIG. 1 is a diagram of a gas handling system 100 for storage and transportation of gas cylinders 110 and for dispensing of gas, such as hydrogen or nitrogen, from the cylinders. Multiple rows of gas cylinders 110 are housed in a frame 120, with the rows of cylinders 110 being positioned from a bottom 101 to a top 103 of the frame 120. In the example of FIG. 1, each frame 120 houses five rows of gas cylinders 110, with five horizontally adjacent gas cylinders 110 in each row. In some examples, the frames 120 can house more or less than five rows, or each row can contain more or less than five cylinders 110. Multiple (e.g., two, in the example of FIG. 1) frames 120 may be mounted, for example, on a bed of a trailer 102 for transportation of the gas cylinders 110 to a desired location, e.g., to a gas dispensing station for dispensing of gas from the cylinders or to a filling station for filling of the cylinders 110 (e.g., filling new cylinders or refilling previously used cylinders).

The cylinders 110 are fluidically coupled to a dispensing cabinet 130 that contains plumbing for dispensing gas from the cylinders 110 and for filling the cylinders 110 with gas. The cylinders 110 can be opened or closed to enable or disable, respectively, flow of gas to or from the cylinders 110. The cylinders 110 in each row are controllable as a unit, such that the cylinders 110 in a given row are either all open or all closed. Each row 112 is controllable independently of each other row. Control of the open or closed status of the rows of cylinders 110 is effected by actuators, such as pneumatic actuators, controllable from a control cabinet 140. The separation of the filling and dispensing of gas (via the dispensing cabinet 130) and the control of the cylinders (via the control cabinet 140) promotes safety, e.g., by permitting an operator to make plumbing connections to the dispensing cabinet 130 and then to control dispensing or filling operations at the control cabinet 140 remote from those plumbing connections. In some examples, remote control of dispensing or filling operations can be performed remote from the control cabinet 140, e.g., through the use of a programmable logic controller (PLC) configured to control the actuators.

In the example of FIG. 1, a front side 104 of each frame 120 faces a rear 106 of the trailer 102. The cylinders 110 are housed in the frames 120 such that a dispensing end of each cylinder 110, through which gas can be dispensed or filled, faces the front side 104 of the frames 120. The dispensing cabinet 130 and control cabinet 140 are mounted at the rear 106 of the trailer 102. This configuration, in which the dispensing ends of the cylinders 110 face the dispensing cabinet 130 and control cabinet 140, reduces the length of tubing for coupling the dispensing cabinet 130 and control cabinet 140 to the cylinders 110.

Figure 2A:
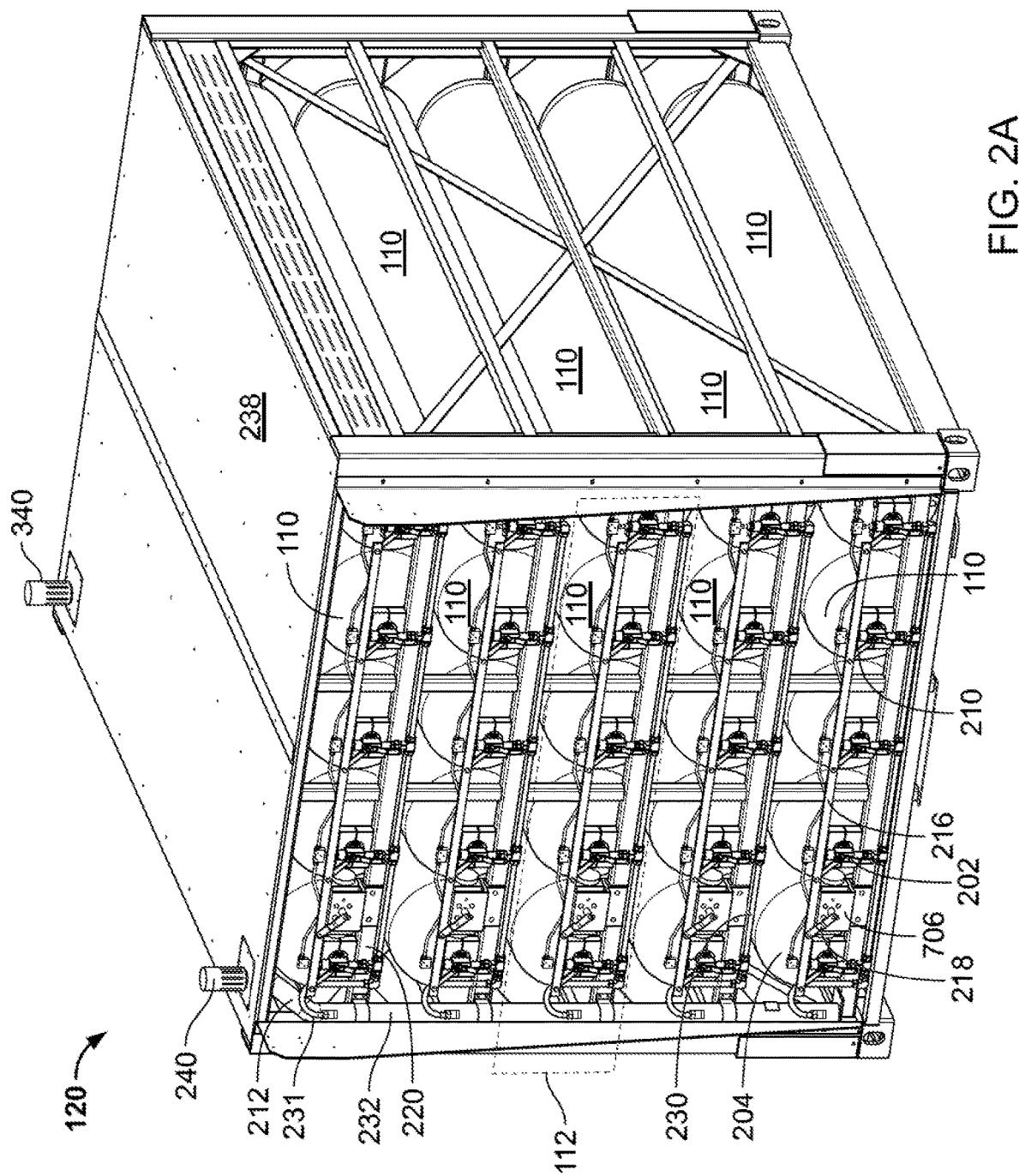
FIGS. 2A and 2B are a perspective view and a front view, respectively, of a frame housing gas cylinders.
Figure 2B:
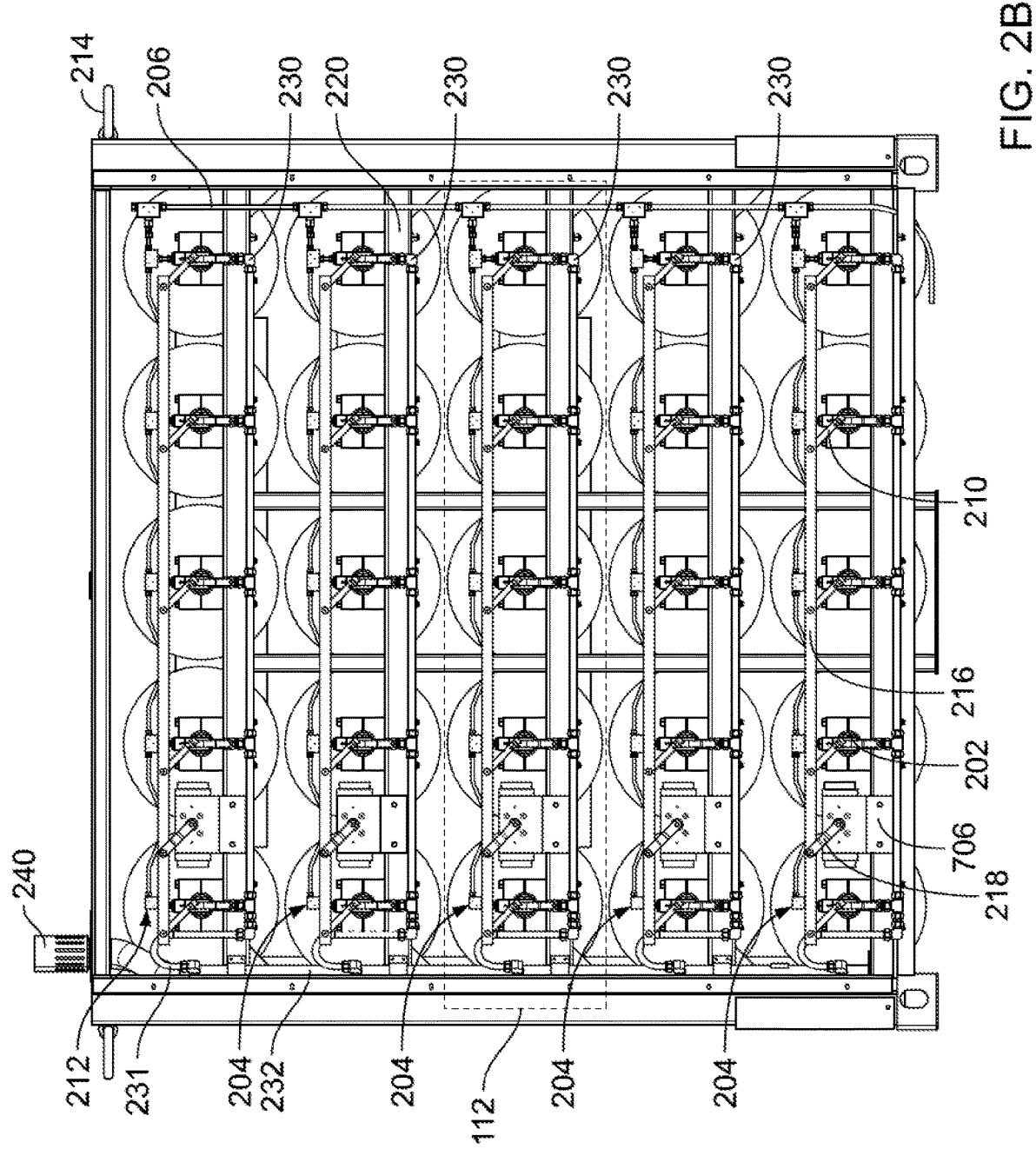

FIGS. 2A and 2B show perspective and front views, respectively, of the frame 120. The frame 120 houses multiple rows of cylinders; one such row 112 is outlined in dashed lines. A front valve assembly 202 (discussed in more detail below) is attached to the dispensing end of each cylinder 110. The front valve assemblies 202 of the cylinders 110 in each row 112 are coupled to a respective horizontal gas manifold 204 for the row. The horizontal gas manifolds 204 for the rows 112 of cylinders 110 are coupled to a common vertical gas manifold 206, which couples to plumbing in the dispensing cabinet 130 (FIG. 1) for dispensing of gas or filling the cylinders 110. When the cylinder valves of the front valve assemblies 202 in a given row 112 are open, gas can flow from the cylinders 110 in that row 112 into the gas manifold 204 and then into the common gas manifold 206 for dispensing, or gas can flow from a gas source into the cylinders 110 via the gas manifolds 206, 204 to fill the cylinders 110.

The front valve assembly 202 of each cylinder 110 includes a lever 210. The position of the lever 210 can be toggled to open or close the cylinder valve of the front valve assembly 202. For instance, when the lever 210 is pointing toward a top left corner 212 of the frame, as shown in FIGS. 2A and 2B, the corresponding cylinder valve of the front valve assembly 202 is closed. When the lever 210 is pointing toward a top right corner 214 of the frame, the corresponding cylinder valve of the front valve assembly 202 is open and gas can flow out of the cylinder into the respective gas manifold 204 (e.g., when dispensing gas), or into the cylinder from the respective gas manifold 204 (e.g., when filling the cylinders 110).

The levers 210 of the front valve assemblies 202 in each row 112 are attached to a respective horizontally oriented actuation bar 216. A control lever 218 is coupled to each actuation bar 216 and mounted on a respective horizontal strut 220 of the frame. Actuation of the control lever 218 (e.g., from the control cabinet 140; see FIG. 1 and discussion below) causes the control lever 218 to move (e.g., rotate), which in turn causes the actuation bar 216 to move horizontally. The motion of the actuation bar 216 changes the position of the levers 210 of the cylinders 110, opening or closing the cylinders 110. Because the cylinder valves of the front valve assemblies 202 in each row 112 are coupled to a common actuation bar 216, all of the cylinder valves of the front valve assemblies 202 in a given row are opened or closed together. The actuation bar 216 of each row is controllable independently from the actuation bar 216 of each other row, and thus the cylinder valves of the front valve assemblies 202 in each row can be opened or closed independently from the cylinder valves of the front valve assemblies 202 in each other row.

The front valve assemblies 202 of the cylinders 110 in each row 112 are also coupled to respective vent manifolds 230. The horizontal vent manifolds 230 for all of the rows 112 of cylinders 110 in the frame 120 are fluidically coupled to a common vent manifold 232 via respective arched connections 231. The common vent manifold 232 extends vertically from the bottom row of gas cylinders 110 to the top row of gas cylinders 110 in the frame 120, adjacent to a side edge of the front side of the frame 120. Towards the top of the frame 120, the vertical vent manifold 232 is angled inwards and extends through an opening in a top cover 238 of the frame 120. A vent cap 240 is fitted over the vertical vent manifold 232 above the top cover 238 of the frame 120 to facilitate exhaust of gas, e.g., hydrogen gas, and to prevent contaminants, such as debris or water, from entering the vertical vent manifold 232.

Figure 3:
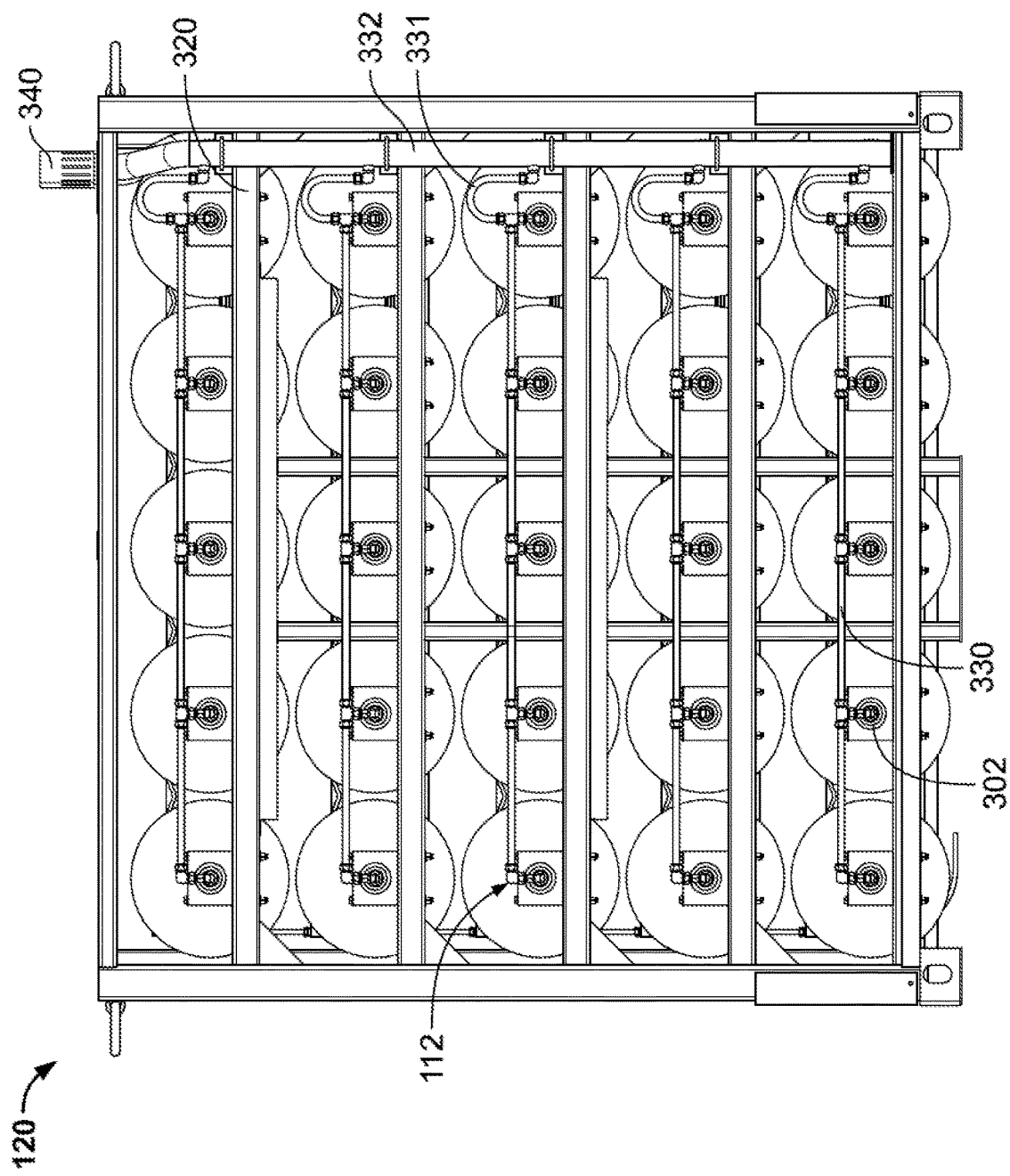
FIG. 3 is a rear view of a frame housing gas cylinders.

Referring to FIG. 3, which shows a rear view of the frame 120, TRD end plug assemblies 302 at the rear ends of the cylinders 110 in each row 112 are coupled to respective rear vent manifolds 330. The rear vent manifolds 330 for all of the rows 112 of cylinders 110 in the frame 120 are fluidically coupled to a common rear vent manifold 332 via respective arched connections 331. The rear vent manifold 332 extends vertically from the bottom row of gas cylinders 110 to the top row of gas cylinders 110 in the frame 120, adjacent to a side edge of the rear side of the frame 120. Towards the top of the rear side of the frame 120, the rear vertical vent manifold 332 is angled inwards and extends out an opening in the top cover of the frame 120. A rear vent cap 340 is fitted over the rear vertical vent manifold 332 above the top cover of the frame 120 to facilitate exhaust of gas, e.g., hydrogen gas, and to prevent contaminants, such as debris or water, from entering the rear vertical vent manifold 332. Horizontal struts 320 extend across the width of the rear side 304.

Figure 4:
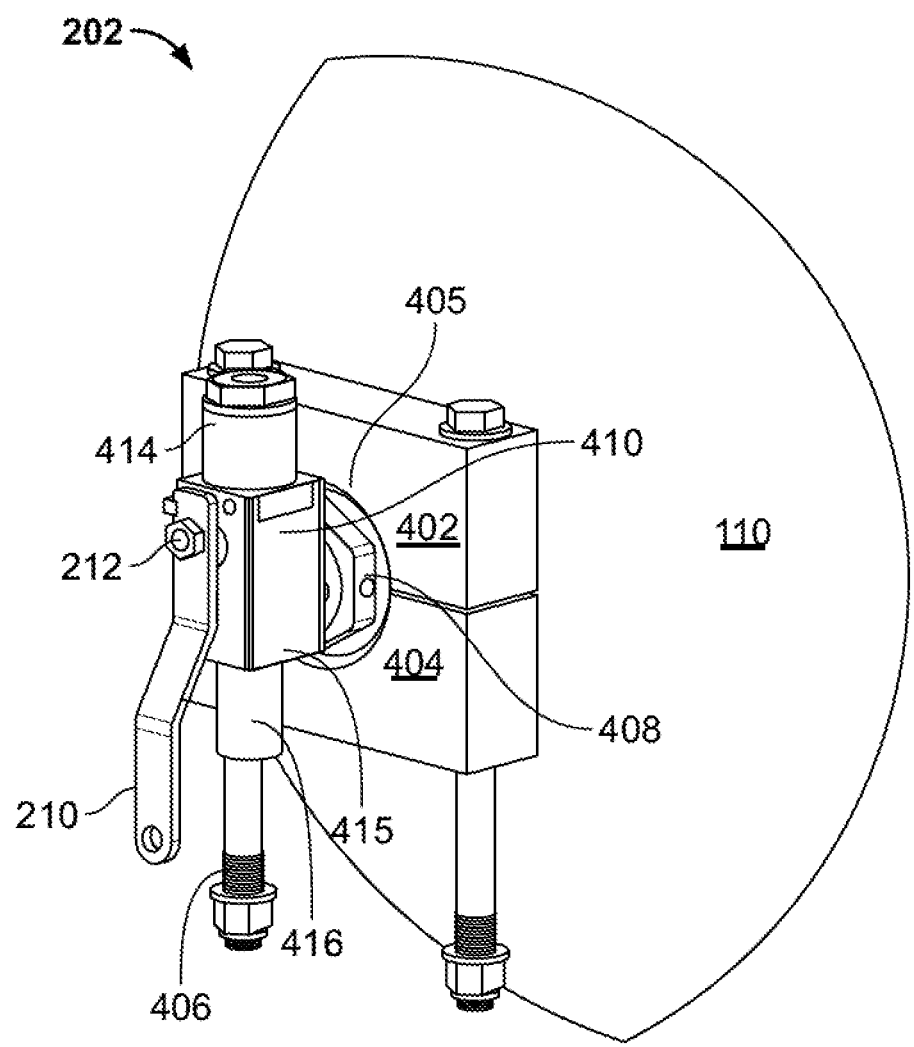
FIG. 4 is a diagram of a cylinder valve assembly.

FIG. 4 shows the front valve assembly 202 that is coupled to the dispensing end of each cylinder 110. The front valve assembly 202 includes a top block 402 and a bottom block 404. Each block 402, 404 is a rectangular block that defines a semicircular opening along one side of the rectangle. When assembled, the blocks 402, 404 are bolted together such that the semicircular openings are adjacent to one another, defining a circular opening 405 that surrounds a neck 408 of the cylinder 110. The bottom block 404 is coupled to support posts 406 that are attached to the corresponding horizontal strut 220 of the frame 120 (see FIGS. 2A and 2B). In some examples, the support posts 406 and the bottom block 404 are formed of a single piece of material. The blocks 402, 404 coupled to the horizontal struts of the frame hold the cylinders in position in the frame 120.

The neck 408 of the cylinder 110 is coupled to the gas manifold 204 (FIGS. 2A and 2B) for the row of cylinders via a valve 410. The lever 210 is attached to the valve 410 at a pivot point 412. The valve 410 is controlled by actuation of the lever 210. When the lever 210 is in a first position, the valve 410 is closed and gas cannot flow into or out of the cylinder 110. When the lever is in a second position, the valve 410 is open and gas can flow into or out of the cylinder 110. Gas flow out of the cylinder proceeds through a connector 414 and into the corresponding gas manifold 204 (see FIGS. 2A and 2B); gas flow into the cylinder follows the same flow path in the opposite direction.

The neck 408 of the cylinder 110 is also coupled to the corresponding vent manifold 230 (FIGS. 2A and 2B) via a vent valve 415 that is closed except when venting is appropriate, e.g., when the temperature on the valve exceeds a threshold. For instance, the vent valve 415 can include a temperature-sensitive valve that opens responsive to a temperature on the valve exceeding a threshold, for example, 102 degrees Celsius. When the vent valve 415 opens, gas flows out of the cylinder 110, through a vent connector 416, and into the corresponding vent manifold 230. As shown in FIG. 4, and with reference to FIG. 2A, the horizontal vent manifold 230 is coupled to the bottom end of the valve 415 via the vent connector 416 which allows vented gas to escape through the horizontal vent manifold 230 and then flow through the common vertical vent manifold 232 and out into the atmosphere.

Figure 5:
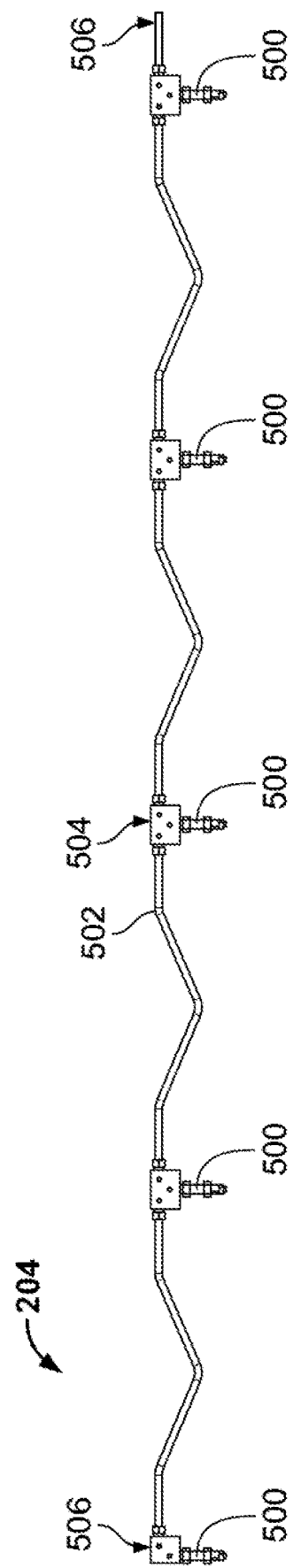
FIG. 5 is a diagram of a horizontal gas manifold.

FIG. 5 shows the gas manifold 204 that supplies gas to and from the cylinders in a given row. When the gas manifold 204 is assembled on the frame, the gas manifold 204 is generally parallel to the corresponding row of cylinders. The gas manifold 204 has a stepwise shape that can help relieve stress from vibrations. In some examples, the gas manifold 204 can be straight. The gas manifold 204 includes multiple connectors 500, with each connector 500 being aligned with the front valve assembly 202 of a corresponding cylinder 110 in the row of cylinders (see FIGS. 2A and 2B). Each connector 500 couples to the connector 414 (FIG. 4) of the corresponding front valve assembly 202 such that the cylinder 110 can be fluidically coupled to the gas manifold 204. The connectors 500 are joined to tubing 502 of the gas manifold 204 at T-junctions 504. A first end 506 of the tubing 502, when the gas manifold 204 is assembled on the frame, is adjacent to the vertical vent manifold 232. The first end 506 of the tubing 502 is closed. A second end 508 of the tubing, when assembled, is coupled to the common gas manifold 206 (FIGS. 2A and 2B).

Figure 6:
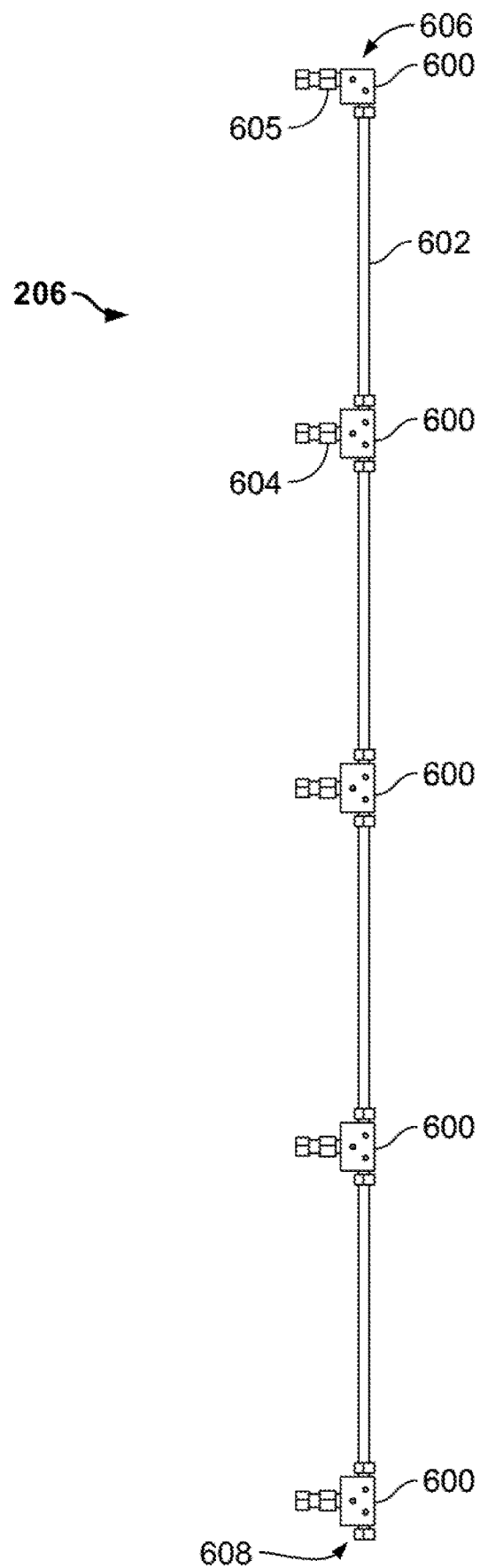
FIG. 6 is a diagram of a common vertical gas manifold.

Referring to FIG. 6, the common gas manifold 206 includes connectors 600, each of which couples to the connector 510 of one of the gas manifolds 204 (see FIGS. 2A, 2B, and 5). In some examples, the connectors 600 include an anti-vibration assembly to help ensure a secure connection to the gas manifolds 204, e.g., during transportation. The connectors 600 are joined to tubing 602 of the common gas manifold 206 at T-junctions 604; a top-most connector 600', which is disposed at a top end 606 of the tubing 602, is joined to the tubing 602 by an elbow joint 605. When the common gas manifold 206 is assembled on the frame, the top end 606 of the tubing 602 is positioned near the top cover 238 (FIG. 2A) of the frame. A bottom end 608 of the tubing 602, when assembled, is coupled to a gas supply line. For instance, the gas supply line can lead to a dispensing nozzle, a filling nozzle, or both.

Referring to FIGS. 7A and 7B, an actuator 700 for opening and closing the valves 410 (FIG. 4) of the cylinders in a given row includes the actuation bar 216, the levers 210 for the cylinders in the row, and the control lever 218 for the row. A first end of each lever 210, 218 is coupled to the actuation bar 216 at respective connection points 702. A second end of each lever 210 is fixed in position by its attachment to the valve 410 (FIG. 4) of the corresponding front valve assembly 202 at the pivot point 412. A second end of the control lever 218 is attached to a pneumatic actuator 706 at a pivot point 708. The pneumatic actuator 706 is attached to the horizontal strut 220 such that the second end of the lever 218 is fixed in position relative to the horizontal strut 220.

When the levers 210 are in a first orientation (FIG. 7A), the valves in the front valve assemblies 202 are closed. When the levers 210 are in a second orientation (FIG. 7B), the valves in the front valve assemblies 202 are open and gas can flow into or out of the cylinders. To move the levers 210 from one orientation to the other (e.g., from the orientation of FIG. 7A to the orientation of FIG. 7B), the control lever 218 is actuated, e.g., by pneumatic actuation implemented by the pneumatic actuator 706. Upon actuation, the lever 218 rotates about its pivot point 708. Because the second end of the lever 218 is fixed at the pivot point 708, this rotation causes the first end of the lever 218 to move to the right, which in turn shifts the actuation bar 216 to the right, indicated by an arrow 720. The rightward motion of the actuation bar 216 causes the levers 210 to rotate about their pivot points 704, opening the valves 410 of the front valve assemblies 202. To close the valves 410, the control lever 218 is actuated in the opposite direction to move the actuation bar 216 to the left, causing rotation of the levers 210 to close the valves 410.

In some examples, e.g., for safety reasons, the pneumatic actuators 706 are actuated by a mechanism that is closed as a default position, e.g., when the pneumatic air pressure is less than a threshold level. For instance, the pneumatic actuators 706 can be spring actuators that are closed by default. This configuration enables the cylinders to be closed rapidly in the event of an emergency, e.g., by venting air in the pneumatic circuitry, thereby causing the pneumatic air pressure to fall below the threshold. Emergency shutoff buttons can be provided at various locations, such as in the control cabinet 350 or at other locations on the frames 120 or trailer 102 (FIG. 1).

Pneumatic actuation of the control levers 218 for each row of cylinders 110 is implemented by pneumatic circuitry coupled to a corresponding switch in the control cabinet 140. In some examples, air for the pneumatic circuitry is obtained from an air tank for an air brake system of the trailer 102 (FIG. 1) carrying the cylinders 110. In some examples, air for the pneumatic circuitry is obtained from an air tank mounted, for example, on the trailer 102 or from a remote source of air (e.g., disposed at some distance from the frames 120).

Referring to FIG. 8A, the vent manifolds 230 provide pathways for gas to be vented from the cylinders to the environment, e.g., in the event that a temperature in one or more of the cylinders or in the gas manifold exceeds a threshold. When the vent manifold 230 is assembled on the frame, the vent manifold 230 is generally parallel to the corresponding row of cylinders. The vent manifold 230 includes multiple connectors 800, with each connector 800 being aligned with the front valve assembly 202 of a corresponding cylinder 110 (see FIGS. 2A and 2B). Each connector 800 couples to the vent connector 416 (FIG. 4) of the corresponding front valve assembly such that the cylinder 110 can be fluidically coupled to the vent manifold 230. The connectors 800 are joined to tubing 802 of the vent manifold 230 at T-junctions 804. An end 806 of the tubing 802 includes a coupling that couples to the common vent manifold 232.

Referring to FIG. 8B, in some examples, the coupling between each vent manifold 230 and the common vent manifold 232 is via a respective arched connection 231. The arched connection 231 extends vertically upwards from the end 806 of the tubing 802, bends around, and extends vertically downwards to the connector 800 to the vertical vent manifold 232. The arched connection 321 can be used to facilitate assembly of the vent manifolds 230 and the common vent manifold 232.

Figure 9C:
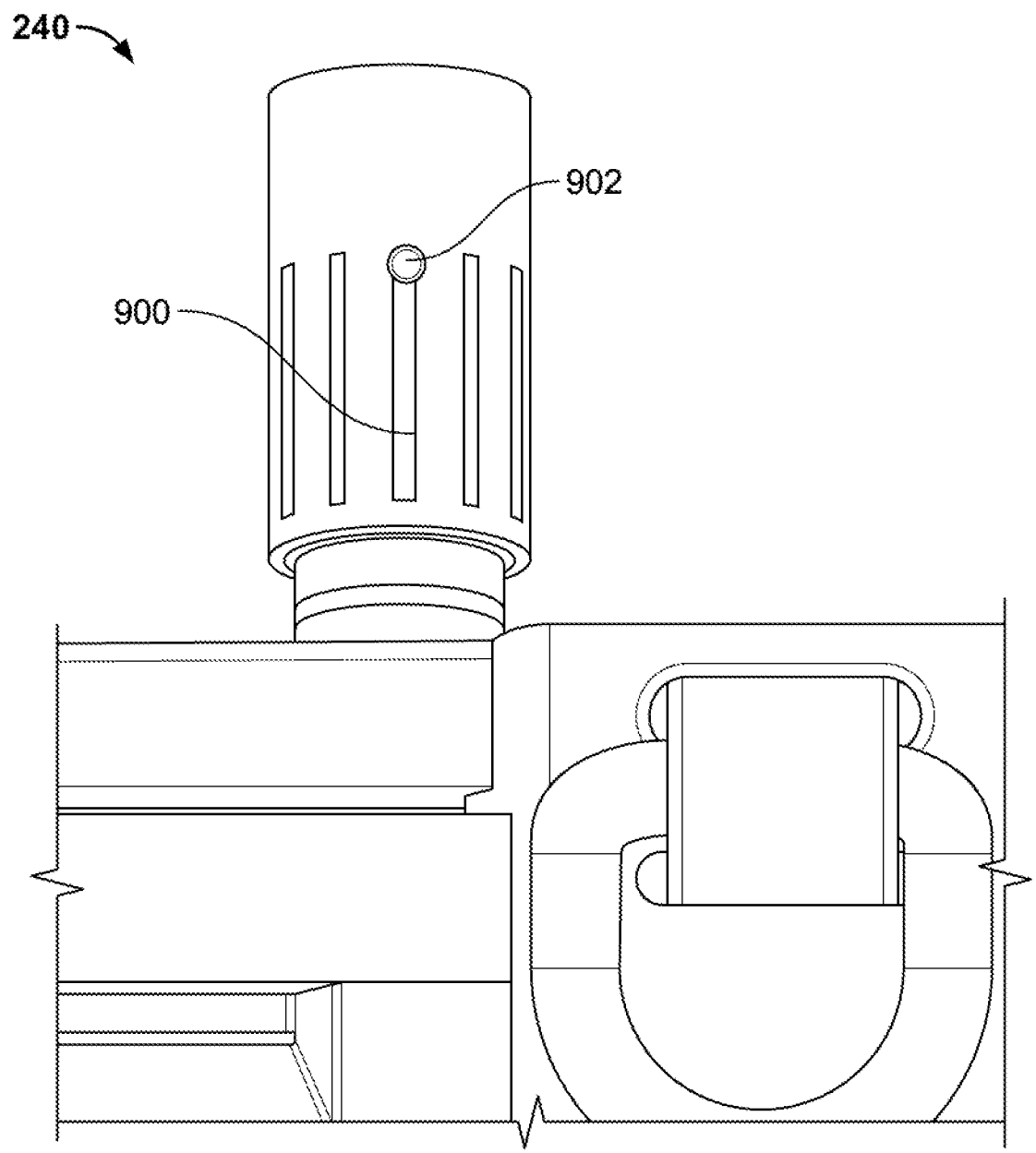

Referring to FIGS. 9A-9C, the vent cap 240 covers the top end of the common vent manifold 232 to facilitate exhaust of gas from the common vent manifold 232 and to prevent contaminants, such as debris or water, from entering the common vent manifold 232. Referring particularly to FIG. 9C, the vent cap 240 is slidably coupled to the common vent manifold 232 such that the vent cap 240 can slide up and down along the portion of the common vent manifold 232 that is exposed above the top cover 238 of the frame. Specifically, the vent cap 240 is generally cylindrical and has a vertically oriented slit 900 defined in its side. An elongated protrusion 902 (e.g., a bolt) attached to the common vent manifold 232 is disposed in the slit 900 and extends from the common vent manifold, through the slit 900, and to the exterior of the vent cap 240. The protrusion 902 acts as a guide as the vent cap 240 slides up and down along the common vent manifold 232. For instance, the protrusion 902 helps to ensure that the vent cap 240 stays in position on the common vent manifold 232 and preventing the vent cap 240 from sliding too far upwards or downwards.

When gas is not being exhausted from the common vent manifold 232, the vent cap 240 is in a lower or closed position (as shown in FIGS. 9A and 9C). The vent cap is close to the top cover 238 of the frame and the top of the slit 900 rests on the protrusion 902. When gas is exhausted from the common vent manifold, the gas pushes the vent cap 240 upwards or open (as shown in FIG. 9B). As the vent cap 240 slides upwards along the common vent manifold 232, the slit 900 slides along the protrusion 902 until the bottom of the slit 900 reaches the protrusion, at which point the vent cap 240 cannot slide further upwards.

Figure 10:
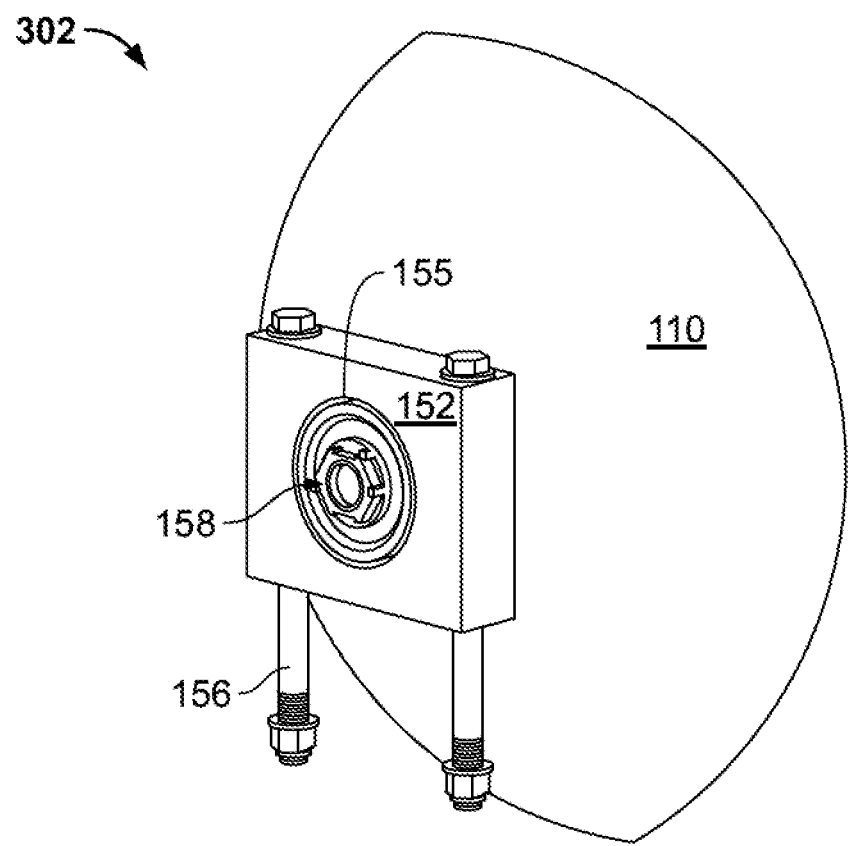
FIG. 10 is a diagram of a TRD end plug assembly.

Referring to FIG. 10, a rear TRD end plug assembly 302 is coupled to the rear end of each cylinder 110. The rear TRD end plug assembly 302 includes a rectangular block 152 that defines a circular opening 155. When assembled, the circular opening 155 surrounds a TRD end plug 158 of the cylinder 110. The block 152 is coupled to support posts 156 that are attached to the corresponding horizontal strut 320 of the frame 120 (see FIG. 3) to hold the cylinder in position in the frame 120. In some examples, the support posts 156 are integral with the block 152. The TRD end plug 158 remains closed except when venting is appropriate, e.g., when a temperature in the cylinder exceeds a threshold. For instance, the TRD end plug 158 can include a temperature-sensitive valve that opens responsive to a temperature on the valve exceeding a threshold such as 102 degrees Celsius. When the TRD end plug 158 opens, gas flows out of the cylinder 110 and into the corresponding rear manifold.

Figure 11:
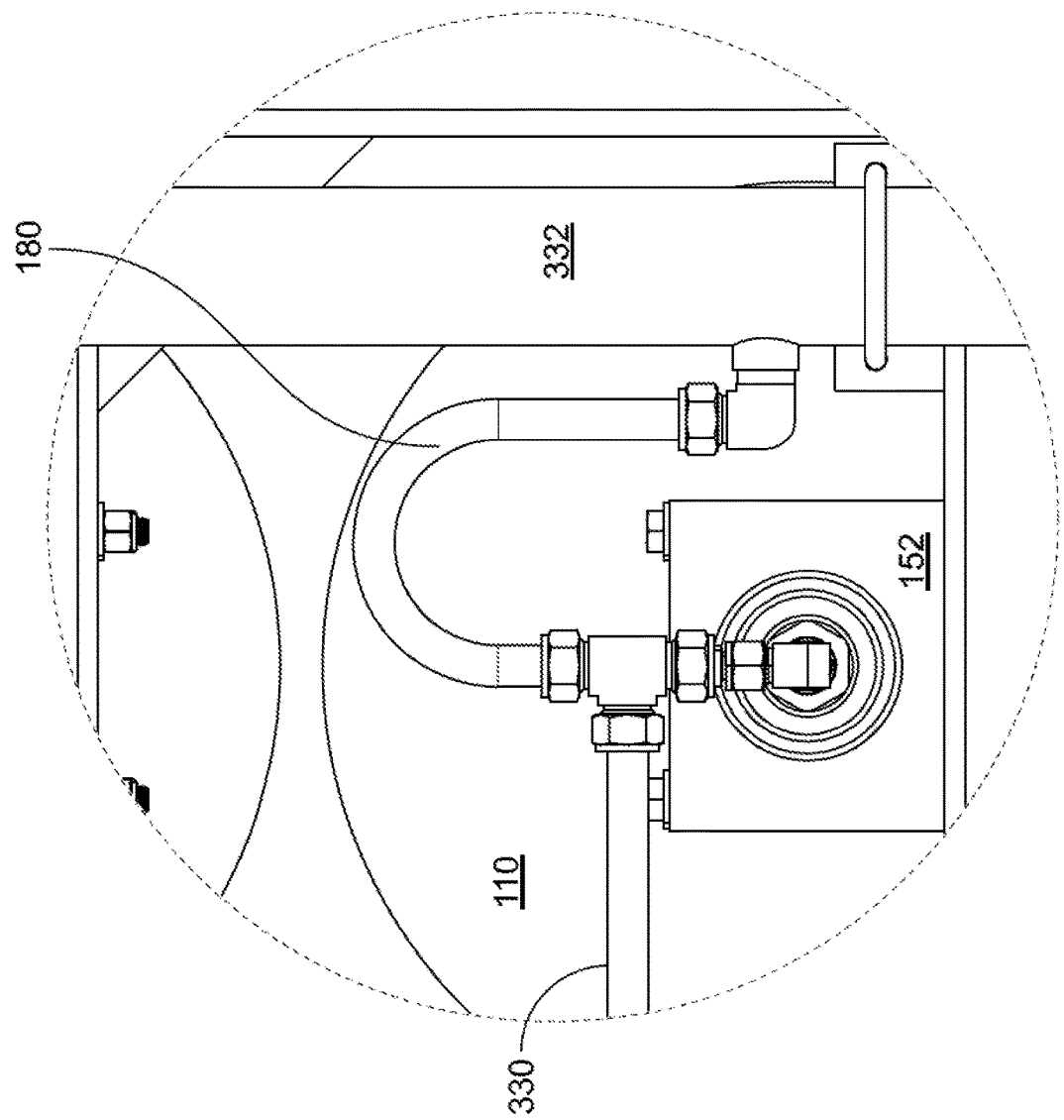
FIG. 11 is a diagram of an arched connection.

Referring to FIG. 11, in some examples, the coupling between each rear vent manifold 330 and the common rear vent manifold 332 is via a respective arched connection 180. The arched connection 180 extends vertically upwards from an end of the rear vertical vent manifold 332, bends around, and extends vertically downwards to a connection 182 with the common rear vent manifold 332.

Referring again to FIG. 3, the rear vent cap 340 is structured similarly to the vent cap 240 (shown in FIGS. 9A-9C). Specifically, the rear vent cap 340 is slidably coupled to the common rear vent manifold 332 such that the rear vent cap 340 can slide up and down along the portion of the common rear vent manifold 332 that is exposed above the top cover 238 of the frame. Specifically, the rear vent cap 340 is generally cylindrical and has a vertically oriented slit defined in its side. An elongated protrusion attached to the common rear vent manifold 332 is disposed in the slit acts as a guide as the rear vent cap 340 slides up and down along the common rear vent manifold 332.

Figure 12:
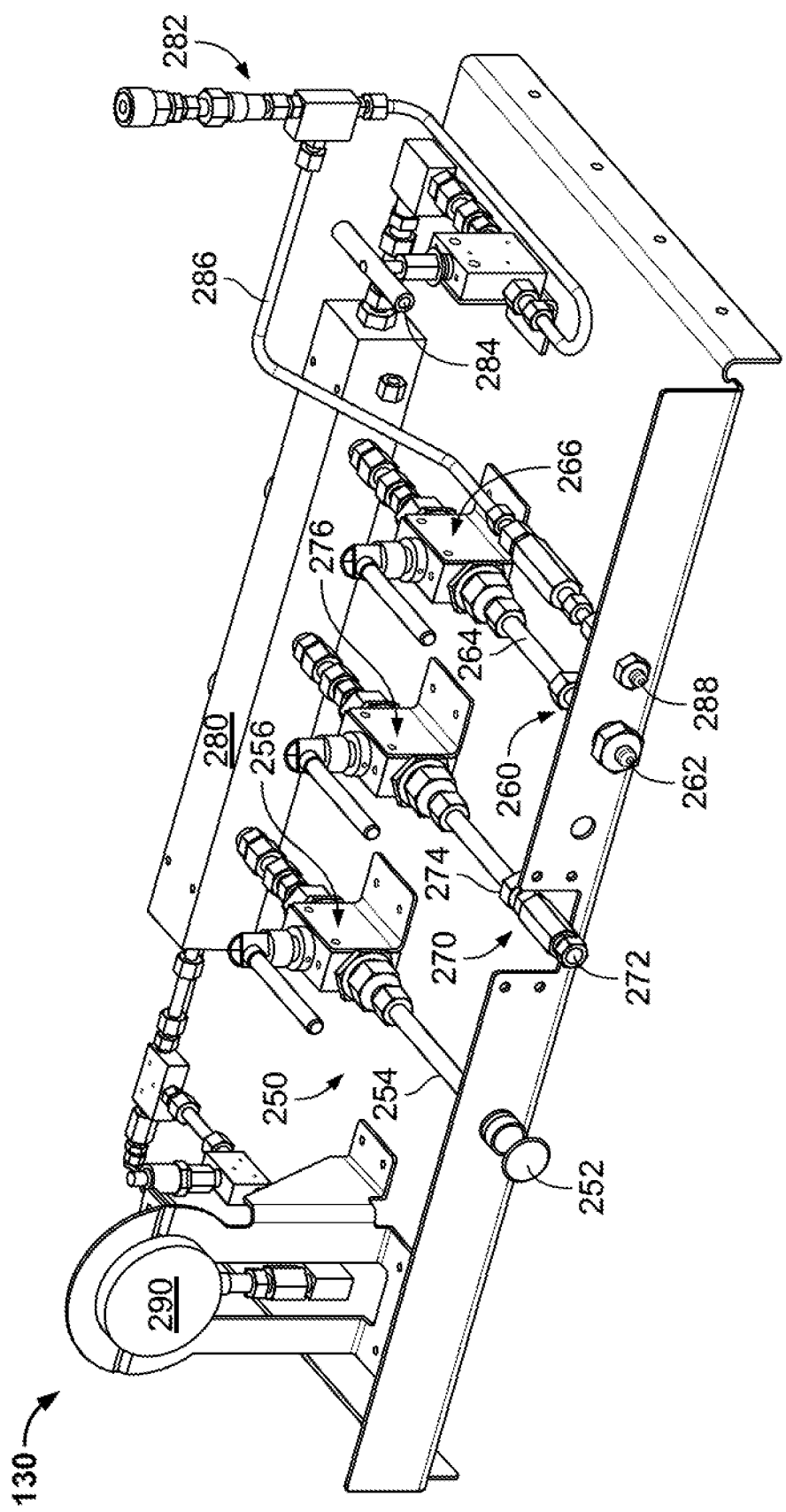
FIG. 12 is a diagram of a fill/dispense control panel.

Referring to FIG. 12, the fill/dispense control panel 130 (FIG. 1) houses plumbing for the dispensing of gas from the cylinders or the filling of gas into cylinders housed in the frames 120. As shown in FIG. 1, the dispensing cabinet 130 is mounted on the same trailer as the frames 120 housing the cylinders. The dispensing cabinet 130 has an exterior housing to protect the plumbing (e.g., tubing, valves, and other fluid flow components) housed therein from ambient conditions.

The plumbing of the dispensing cabinet 130 includes a cylinder filling assembly 250 that includes a filling inlet 252 configured to couple with a gas source, such as a source of hydrogen or nitrogen gas. Gas from the gas source flows into filling tubing 254 via the filling inlet 252. Flow through the filling assembly 250 is controlled by a valve 256. The filling of the cylinders is also controlled by actuation of the levers 210 to open the cylinders to receive gas, as described above and with respect to FIGS. 13A-13C.

The plumbing of the dispensing cabinet 130 also includes a gas dispensing assembly 260 includes a dispensing outlet 262 configured to couple with a destination for gas dispensed from the cylinders housed in the frame, e.g., a gas cylinder or tank at a local storage, a vehicle powered by the gas (e.g., a hydrogen-powered vehicle), or another destination. Gas flows from the cylinders through dispensing tubing 264 and out to the destination via the dispensing outlet 262. Flow through the dispensing assembly 260 is controlled by a valve 266. The dispensing of gas from the cylinders is also controlled by actuation of the levers 210 to open the cylinders to dispense gas, as described above and with respect to FIGS. 13A-13C.

An auxiliary assembly 270 housed in the dispensing cabinet 130 provides an alternate flow pathway for filling or dispensing gas from the cylinders housed in the frame. The auxiliary assembly 270 includes a connector 272 that can act as an inlet or outlet. Gas flow along auxiliary tubing 274, e.g., into the cylinders for filling or out of the cylinders for dispensing, is controlled by a valve 276.

In some examples, the inlet 252 of the cylinder filling assembly 250, the outlet 262 of the dispensing assembly 260, and the connector 272 of the auxiliary assembly 270 is each a different type of connection. This configuration facilitates connection with various types of filling or dispensing systems. In some examples, one or more of the inlet 252 of the cylinder filling assembly 250, the outlet 262 of the dispensing assembly 260, and the connector 272 of the auxiliary assembly 270 can be replaced with a different type of connection, providing additional flexibility to facilitate connection with various types of filling or dispensing systems.

In the example of FIG. 12, the valves are manually operated valves. In some examples, automated valves, e.g., digitally controlled valves, can be implemented to control gas flow through the filling and dispensing assemblies.

The filling tubing 254, dispensing tubing 264, and auxiliary tubing 274 are coupled to a common manifold 280 that couples via tubing 282 to the vertical gas manifold 206 (FIGS. 2A and 2B). Flow along the tubing 282 to or from the common manifold 280 is controlled by a valve 284. The tubing 282 is vented via a vent tube 286 to a vent outlet 288. A pressure gauge 290 is coupled to the common manifold 280 to indicate the gas pressure in the common manifold 280.

Figure 13A:
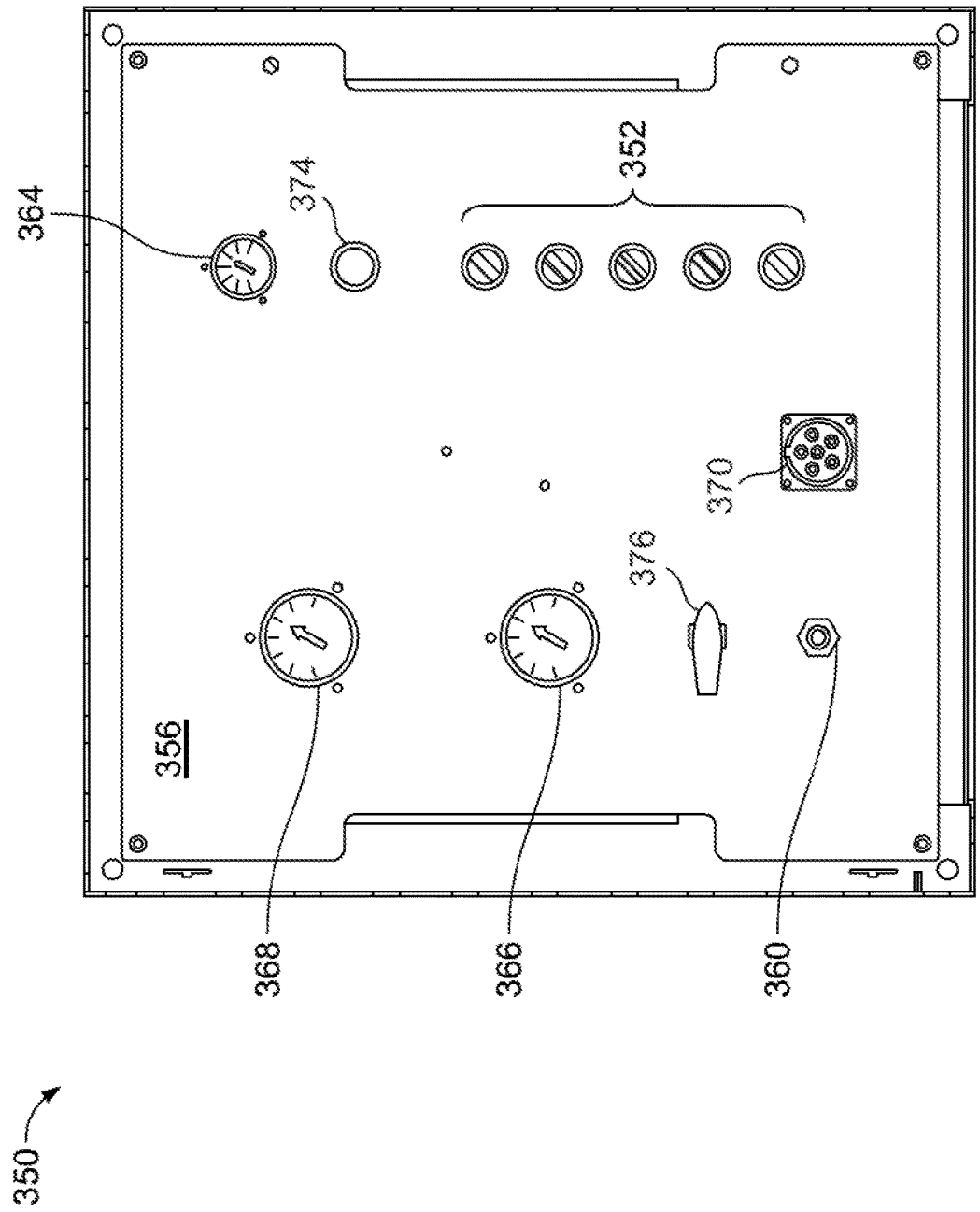
FIG. 13A is a diagram of the front of an ESD/Pneumatic control panel.
Figure 13B:
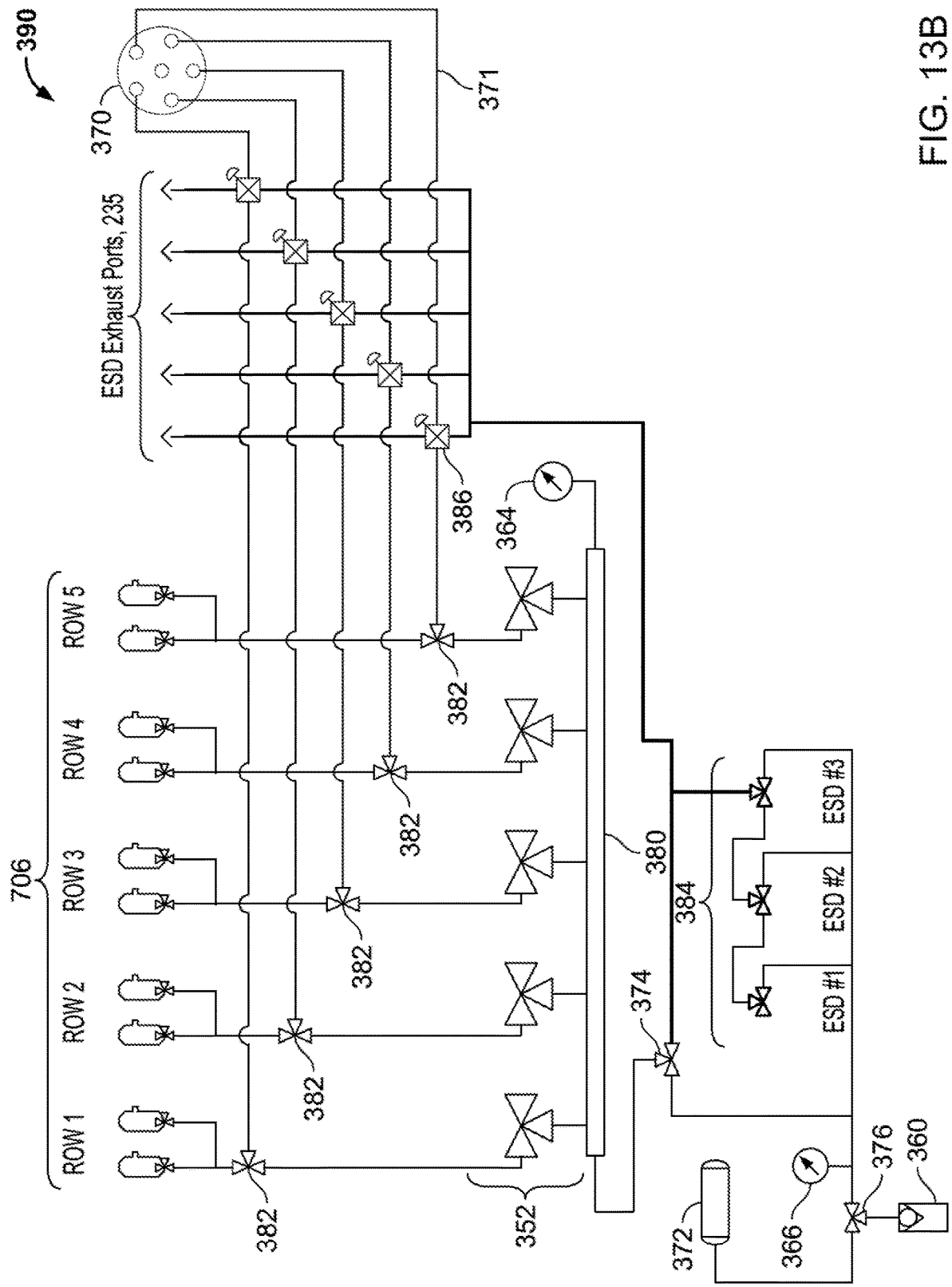

Referring to FIGS. 13A and 13B, the Emergency Shutdown (ESD)/Pneumatic control cabinet 140 (FIG. 1) houses a control panel 350 that provides an interface by which a user can open or close the cylinders in a given row 112 (FIGS. 2A and 2B). FIG. 13A shows a front, user-facing side 356 of the control panel 350. FIG. 13B is a schematic diagram of plumbing connections 390 between the control panel 350 and the pneumatic actuators 706 that control the opening and closing of the cylinders.

The front side 356 of the control panel 350 includes five actuator switches 352, each switch corresponding to one of the rows of cylinders. The switches 352 can be push button switches, levers, knobs, or another type of switch. The switches 352 are coupled to a pneumatic actuator system such that when a switch is toggled, the control lever 218 (FIGS. 7A-7B) of the corresponding row 112 of cylinders is pneumatically actuated, thereby opening or closing the cylinders in that row. In the example described here, each switch 352 controls the pneumatic actuators 706 for a corresponding row 112 of cylinders in each of the multiple frames 120 mounted on the trailer 102. In some examples, the control cabinet 140 includes additional switches such that each switch 352 controls the pneumatic actuators 706 for a corresponding row of cylinders in a corresponding one of the multiple frames 120.

Referring also to FIG. 13B, each switch 352 is coupled to pneumatic circuitry on a rear side of the control panel 350. Each pneumatic circuitry is coupled to the pneumatic actuators 706 for the respective row 112 of cylinders (FIGS. 7A and 7B) of each frame 120. In this way, when one of the switches 352 is toggled, the lever 218 of each of the corresponding rows 112 of cylinders of each frame is pneumatically actuated by the respective pneumatic actuator 706, and the cylinders in that row are opened or closed. In some examples, each switch 352 controls the pneumatic actuator 706 for a row of cylinders in only a single frame 120.

In the example of FIGS. 13A and 13B, the control panel 350 also includes a multi-tube connector 370, such as a Twintec (Auburn, Wash.) port. The multi-tube connector 370 enables remote control of the pneumatic actuators 706 by a controller coupled to ports of the multi-tube connector 370 by respective air lines, with pneumatic circuitry 371 coupling those air lines to the pneumatic switches 706. The controller can be located remote from the control panel 350, e.g., in a nearby office or a remote area of a gas distribution facility, to provided added safety for the operator. In some examples, the remote controller can be a programmable logic controller (PLC) with a logic control system providing pneumatic control outputs.

The air for the pneumatic circuitry is provided from an external air source to a pneumatic manifold 380 that is coupled to the pneumatic circuitry through the switches 352. In some examples, the air is provided from an air tank 372 (FIG. 13B) that supplies the air brakes of the trailer on which the gas handling system is mounted. An air chuck 360 provides a connection to an additional or alternate source of air for the pneumatic circuitry. A valve 376, such as a three-way valve, enables selection of the source of air provided to the pneumatic circuitry.

Referring to FIG. 13C, when the switches 352 are used to control the pneumatic actuators 706, air flows through the pneumatic circuitry from a given switch 352, through a three-way valve 382, and to the corresponding pneumatic actuator 706. The three-way valve 382 prevents air flow between the multi-tube connector 370 and the pneumatic actuator 706. Referring to FIG. 13D, when the multi-tube connector 370 is used to control the pneumatic actuators 706, air flows from a tube coupled to the multi-tube connector 370, through the three-way valve 382, and to the corresponding pneumatic actuator 706. The three-way valve prevents air flow between the switches and the pneumatic actuators.

Referring again to FIGS. 13A and 13B, an isolation valve 374 on the control panel 350 controls the provision of air to the pneumatic manifold 380 and thus to the switches 352, pneumatic circuitry, and pneumatic actuators 706. Additional emergency shut-off valves 384 are also operable to vent the air in the pneumatic manifold 380, switches 352, pneumatic circuitry, and pneumatic actuators 706 through one or more of the ESD exhaust ports 235 and/or the available relief ports on the switches 352 or valves 386. The emergency shut-off devices (ESDs) 384 can be positioned at various locations on the control panel or dispensing cabinet 130, the frame 120, or the trailer 102.

Closing the isolation valve 374 or any of the emergency shut-off devices 384 vents the air in the pneumatic manifold 380, switches 352, pneumatic circuitry, and pneumatic actuators 706 through the one or more of the ESD exhaust ports and/or the available relief ports on the switches 352 or valves 386. Because the pneumatic actuators 706 have default closed position when the pneumatic air pressure is below a threshold, this venting of air causes all of the pneumatic actuators 706 to close substantially immediately, thus closing all of the cylinders. In the event of an emergency, the isolation valve 374 provides an operator with the ability to quickly close all cylinders.

The ESD exhaust ports 235 are coupled to the pneumatic circuitry 371 of the multi-tube connector 370 by valves 386. When air flows through the ESD exhaust ports 235 (e.g., when one or more of the isolation valve 374 or the emergency shut-off valve(s) 384 is engaged for an emergency shut-off), the valves 386 are activated to prevent air from flowing through the pneumatic circuitry 371. The presence of the valves 386 enables an emergency shut-off activated by engagement of one or more of the isolation valve 374 or the emergency shut-off valve(s) 384 to take effect even when control of the pneumatic actuators 706 is effected through the multi-tube connector 370.

FIG. 13E illustrates an air flow pathway when a particular emergency shut-off valve 384 is engaged. The engagement of the emergency shut-off valve 384 opens an air flow pathway through the valve 386 and out the ESD exhaust port 235. The air flow pathway between the multi-tube connector 370 and the corresponding pneumatic actuator 706 (by way of the three-way valve 382) is closed.

Gauges on the front side 356 of the control panel 350 provide information indicative of air and gas pressures in the system. A gauge 364 displays the air pressure in the common manifold 280 (FIG. 12). A gauge 366 displays the air pressure at the air inlet port 360. A gauge 368 displays the gas pressure in the pneumatic manifold 380.

Referring to FIG. 14, in an example method for dispensing gas, air is provided to pneumatic circuits of a gas dispensing system from an air supply, such as a tank for an air brake system of a trailer on which the gas dispensing system is mounted (460). The gas dispensing system includes a frame housing multiple rows of gas cylinders, e.g., hydrogen or nitrogen gas cylinders. The gas dispensing system includes a common gas manifold fluidically coupled to a gas outlet for dispensing of gas from the gas cylinders, and fluidically coupled to a gas manifold for each row of gas cylinders. The gas manifold for a given row of gas cylinders is fluidically coupled to each cylinder in the row via a respective dispensing valve. The gas dispensing system also includes a control lever for each row of gas cylinders, each control lever for coupled to a respective one of the pneumatic circuits.

A particular one of the pneumatic circuits is actuated (462) to open the dispensing valves of the gas cylinders in a particular row of cylinders corresponding to that switch. Actuation of the particular pneumatic circuit causes the control lever coupled to that pneumatic circuit to be actuated (464), which in turn moves an actuation arm for that row (466). A lever is coupled to the dispensing valve of each gas cylinders, and the levers for the gas cylinders in a given row are all coupled to the actuation arm for that row. Movement of the actuation arm for a particular row thus causes the levers for the gas cylinders in that row to be actuated (468), opening the dispensing valves for the cylinders in the row (470). In some examples, the pneumatic circuit is actuated by operation of a switch, e.g., a switch in a control panel that is mounted on a bed of the trailer. In some examples, the pneumatic circuit is actuated using a programmable logic controller coupled to the particular pneumatic circuit, e.g., through a multi-tube connector.

Once the dispensing valves are opened for cylinders in a given row, gas flows out from those cylinders, through the gas manifold for that row, through the common gas manifold, and out the gas outlet for dispensing (472).

In some examples, an emergency switch is operated (474) to vent gas along each horizontal vent manifold and through the common vertical vent manifold into the environment. For instance, the emergency switch can be operated, e.g., if a gas pressure in a gas manifold or a gas cylinder exceeds a threshold value, or if an uncontrolled gas flow occurs, a vent valve for each of one or more cylinders is opened.

Figure 15A:
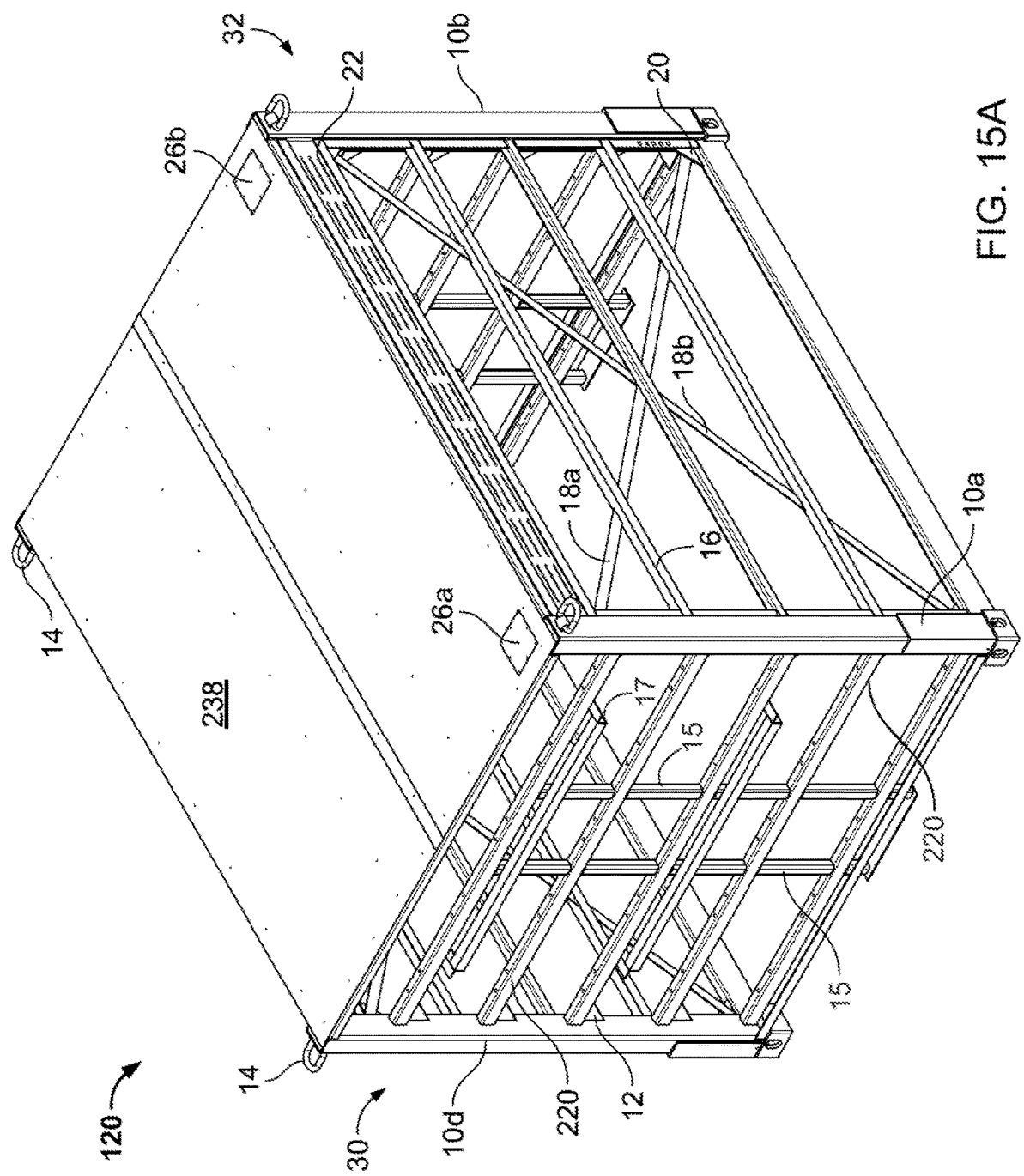
FIGS. 15A, 15B, and 15C are perspective, front, and side views, respectively, of a frame for housing gas cylinders.
Figure 15B:
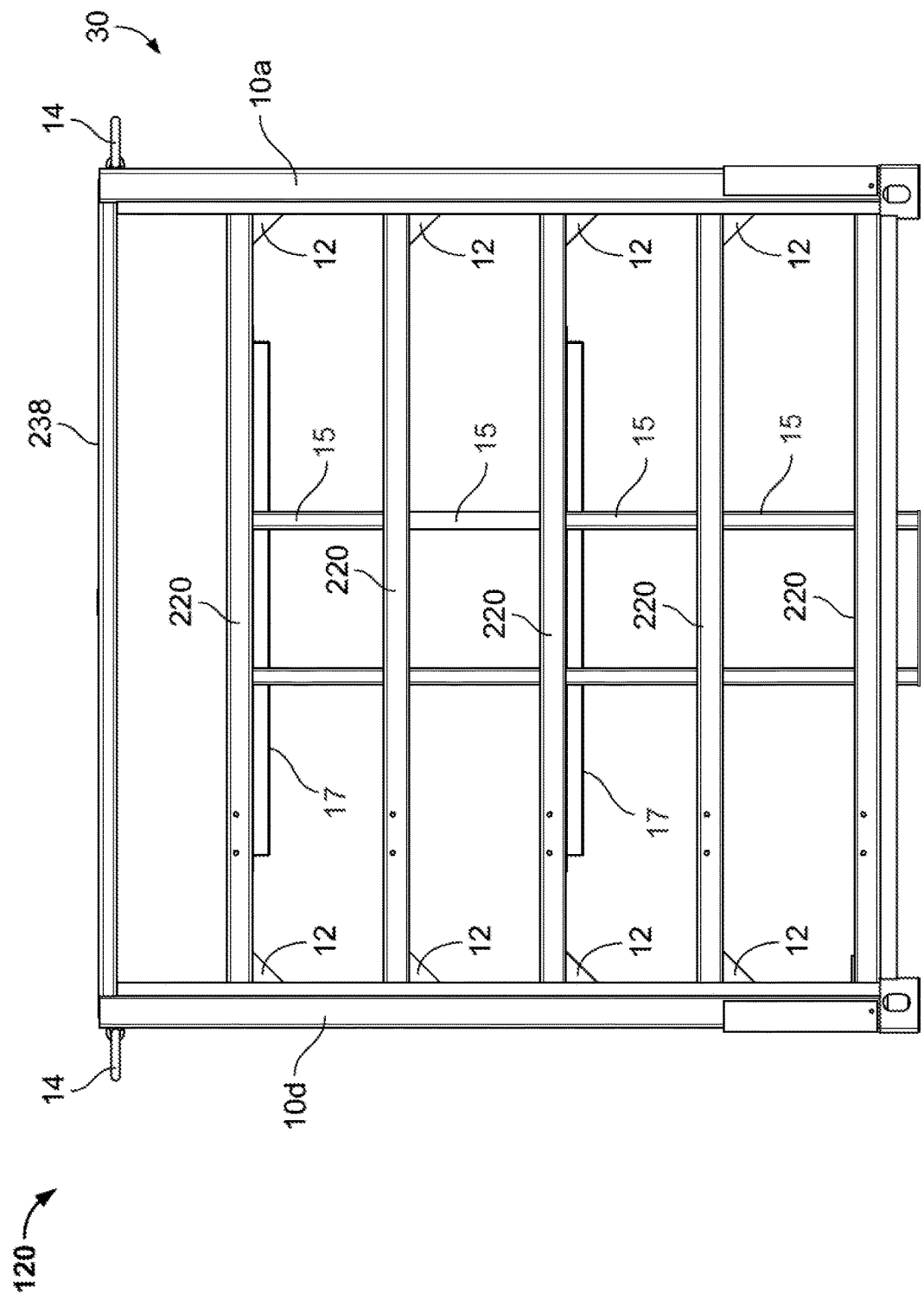
Figure 15C:
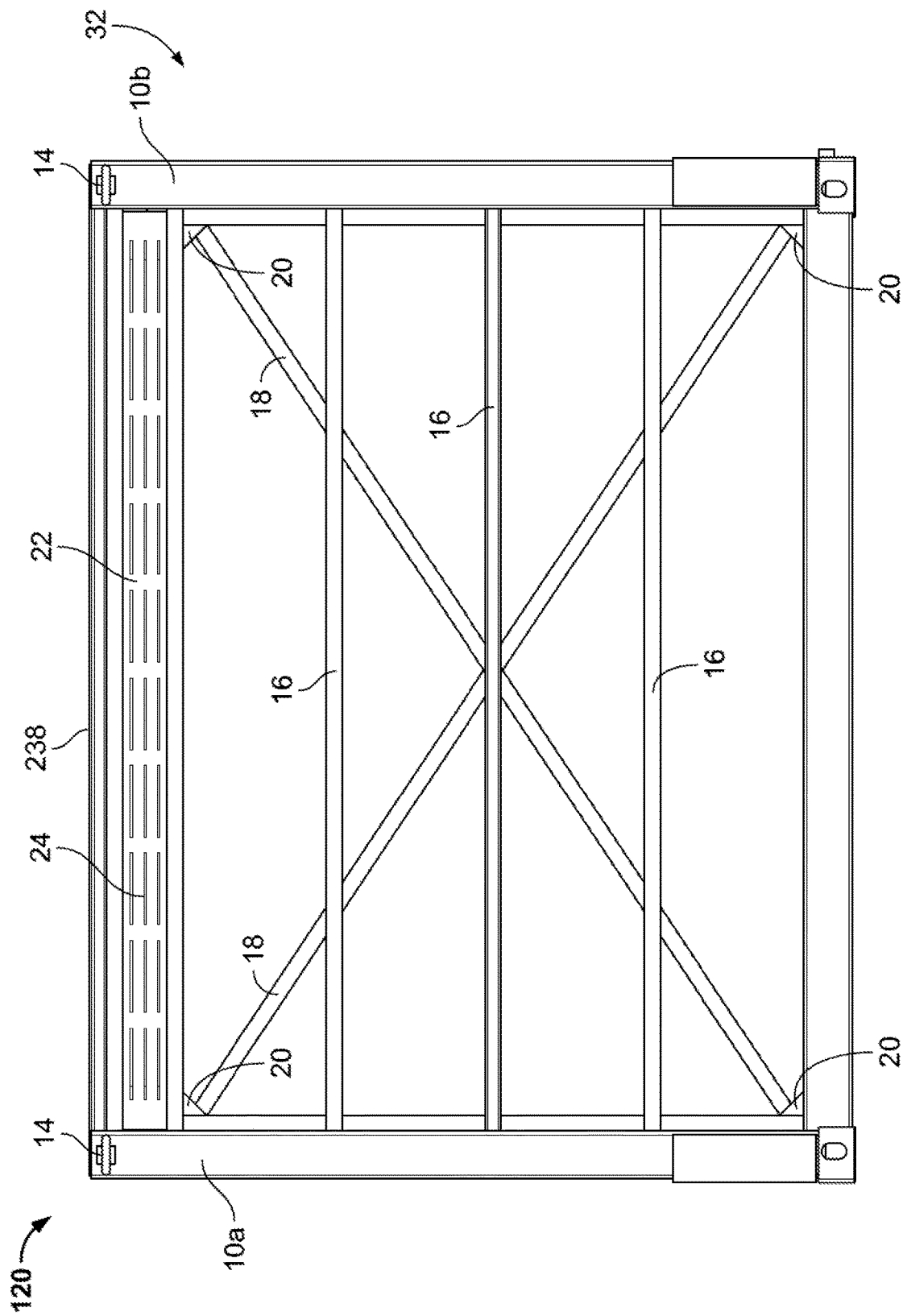

FIGS. 15A-15C show perspective, front, and side views of an example construction for the frame 120. The frame includes four parallel posts 10a-10d defining the edges of the frame. Each post 10a-10d extends from the top to the bottom of the frame 120. When the frame is in use, e.g., mounted on a trailer or housing gas cylinders, the posts 10a-10d are oriented vertically.

Referring specifically to FIGS. 15A and 15B, the horizontal struts 220 extend across a front 30 of the frame 120 between the posts 10a and 10d. When the frame 120 houses cylinders, each row of cylinders aligns with one of the horizontal struts 220 such that the corresponding strut 220 supports the cylinders in the row. Each strut 220, except for the bottom strut, is supported by triangular support elements, such as triangular gussets 12 disposed below the strut 220 at its intersections with the posts 10a, 10d. The support gussets 12 strengthen the frame. Additional mechanical support is provided by vertical struts 15. A similar structure of struts and triangular support elements exists on the back of the frame as well.

Horizontal attachment posts 17 extend in front of the plane of the front 30 of the frame 120. Attachment rings 14 are disposed at the top corners of the frame 120 on a right side 23 and a left side of the frame 120. The attachment posts 17 and attachment rings 14 can be used for handling the frame (e.g., for mounting the frame on the trailer) or for attaching items to the frame (e.g., a siding cover).

Referring specifically to FIGS. 15A and 15C, horizontal struts 16 extend across each side of the frame 120; the right side 32 is shown in FIG. 15C, and the left side 34 has a similar structure. In addition to the horizontal struts 16, diagonal struts 18a, 18b also extend across each side 32, 34 of the frame 120. The diagonal strut 18a extends from the top front corner to the bottom rear corner of the frame, and the diagonal strut 18b extends from the top rear corner to the bottom front corner of the frame. Triangular support elements 20 support the frame at the corners where the diagonal struts 18a, 18b intersect with the posts 10a-10d.

A vent panel 22 is disposed at the top of each side of the frame 120 and extends across at least a portion of the side of the frame. In the example of FIGS. 15A-15C, the vent panel 22 extends across the entire side. Vent slits 24 are defined in the vent panel 22 and allow potential buildup of gas in the interior of the frame to escape.

Referring specifically to FIG. 15A, the top cover 238 of the frame extends between the four posts 10a-10d that define the edges of the frame. Front and rear openings 26a, 26b in the top cover 238 are present and covered when not in use. When cylinders are mounted on the frame 120, the common vent manifolds extend through the openings 26a, 26b in the top cover 238.

Particular embodiments of the subject matter have been described. Other embodiments are within the scope of the following claims.

What is claimed is:

1. A gas dispensing system comprising:
   a frame configured to house multiple rows of gas cylinders;
   a common gas manifold fluidically coupled to a gas outlet for dispensing of gas from the gas cylinders;
   a gas manifold for each row of gas cylinders, in which the gas manifold for a given row of gas cylinders is configured to be fluidically coupled to each cylinder in the row by a respective dispensing valve, and in which each gas manifold is fluidically coupled to the common gas manifold;
   a vent manifold for each row of gas cylinders, in which the vent manifold for a given row of gas cylinders is configured to be fluidically coupled to each cylinder in the row via a respective vent valve, in which each vent valve is configured to open when a temperature on the vent valve exceeds a threshold temperature;
   a common vent manifold, in which each vent manifold is fluidically coupled to the common vent manifold, and in which an end portion of the common vent manifold extends through an opening defined in a cover of the frame;
   a lever for each gas cylinder, in which each lever is configured to be coupled to the dispensing valve of the corresponding gas cylinder; and
   an actuation bar for each row of gas cylinders,
   in which the levers for the gas cylinders in each row are attached to the actuation bar for the corresponding row.

2. The gas dispensing system of claim 1, comprising a control lever for each actuation bar,
   in which each control lever is mounted on the frame and attached to the corresponding actuation bar, and
   in which actuation of the control lever for a given row causes motion of the actuation bar for the row to open or close the dispensing valves for the gas cylinders in the row.

3. The gas dispensing system of claim 2, comprising a pneumatic circuit for each row of gas cylinders, in which motion of the control lever for a given row is actuated by the corresponding pneumatic circuit.

4. The gas dispensing system of claim 3, comprising a control panel comprising a switch for controlling each pneumatic circuit.

5. The gas dispensing system of claim 3, in which the pneumatic circuits are configured to be coupled to an air supply.

6. The gas dispensing system of claim 3, wherein the air supply comprises a tank for an air brake system of a vehicle on which the frame is mountable.

7. The gas dispensing system of claim 3, in which each pneumatic circuit is coupled to a respective port of a multi-tube connector.

8. The gas dispensing system of claim 3, comprising an emergency switch, in which actuation of the emergency switch is configured to cause venting of air in each pneumatic circuit.

9. The gas dispensing system of claim 8, in which each pneumatic circuit comprises first pneumatic circuitry controllable by a respective switch and second pneumatic circuitry coupled to a respective port of a multi-tube connector, and in which actuation of the emergency switch is configured to cause venting of air in the first pneumatic circuitry and the second pneumatic circuitry of each pneumatic circuit.

10. The gas dispensing system of claim 1, comprising an arched connection coupling each vent manifold to the common vent manifold.

11. The gas dispensing system of claim 1, comprising:
a rear vent manifold for each row of gas cylinders, in which the vent manifold for a given row of gas cylinders is configured to be fluidically coupled to a rear venting device of each cylinder in the row, in which each rear venting device is configured to open when a temperature on the rear venting device exceeds a threshold temperature; and
a common rear vent manifold, in which each rear vent manifold is fluidically coupled to the common rear vent manifold.

12. The gas dispensing system of claim 1, comprising a vent cap slidably coupled to the common vent manifold such that the vent cap can slide along the end portion of common vent manifold.

13. The gas dispensing system of claim 12, in which the vent cap has a cylindrical shape, and in which a slit is defined along an axis of the cylinder.

14. The gas dispensing system of claim 13, in which the end of the common vent manifold comprises a protrusion disposed in the slit of the vent cap.

15. The gas dispensing system of claim 1, in which the frame comprises diagonal struts on a side face of the frame, each diagonal strut extending from a top corner to an opposite bottom corner of the side face of the frame.

16. The gas dispensing system of claim 1, in which the frame is mountable on a trailer.

17. A gas dispensing system comprising;
a frame configured to house multiple rows of gas cylinders;
a common gas manifold fluidically coupled to a gas outlet for dispensing of gas from the gas cylinders;
a gas manifold for each row of gas cylinders, in which the gas manifold for a given row of gas cylinders is configured to be fluidically coupled to each cylinder in the row by a respective dispensing valve, and in which each gas manifold is fluidically coupled to the common gas manifold;
a vent manifold for each row of gas cylinders, in which the vent manifold for a given row of gas cylinders is configured to be fluidically coupled to each cylinder in the row via a respective vent valve, in which each vent valve is configured to open when a temperature on the vent valve exceeds a threshold temperature;
a common vent manifold, in which each vent manifold is fluidically coupled to the common vent manifold, and in which an end portion of the common vent manifold extends through an opening defined in a cover of the frame;
a rear vent manifold for each row of gas cylinders, in which the vent manifold for a given row of gas cylinders is configured to be fluidically coupled to a rear venting device of each cylinder in the row, in which each rear venting device is configured to open when a temperature on the rear venting device exceeds a threshold temperature;
a common rear vent manifold, in which each rear vent manifold is fluidically coupled to the common rear vent manifold; and
a rear vent cap slidably coupled to the common rear vent manifold such that the rear vent cap can slide along an end portion of the common rear vent manifold, the end portion of the common rear vent manifold extending through a rear opening defined in the cover of the frame.

18. The gas dispensing system of claim 17, comprising an arched connection coupling each vent manifold to the common vent manifold.

19. The gas dispensing system of claim 17, comprising a vent cap slidably coupled to the common vent manifold such that the vent cap can slide along the end portion of common vent manifold.

20. The gas dispensing system of claim 17, in which the frame comprises diagonal struts on a side face of the frame, each diagonal strut extending from a top corner to an opposite bottom corner of the side face of the frame.

21. The gas dispensing system of claim 17, in which the frame is mountable on a trailer.

22. The gas dispensing system of claim 17, comprising:
a lever for each gas cylinder, in which each lever is configured to be coupled to the dispensing valve of the corresponding gas cylinder; and
an actuation bar for each row of gas cylinders,
in which the levers for the gas cylinders in each row are attached to the actuation bar for the corresponding row.

\* \* \* \* \*